(12) United States Patent
Wallace et al.

(10) Patent No.: US 7,949,777 B2
(45) Date of Patent: May 24, 2011

(54) COMMUNICATION PROTOCOL FOR CONTROLLING TRANSFER OF TEMPORAL DATA OVER A BUS BETWEEN DEVICES IN SYNCHRONIZATION WITH A PERIODIC REFERENCE SIGNAL

(75) Inventors: Ron Wallace, Lexington, MA (US); Harry Der, Westford, MA (US); Martin Corbett, Westford, MA (US); Terrence Fetters, Tewksbury, MA (US)

(73) Assignee: Avid Technology, Inc., Burlington, MA (US)

( * ) Notice: Subject to any disclaimer, the term of this patent is extended or adjusted under 35 U.S.C. 154(b) by 2620 days.

(21) Appl. No.: 10/286,215

(22) Filed: Nov. 1, 2002

(65) Prior Publication Data

US 2004/0086000 A1    May 6, 2004

(51) Int. Cl.
    *G06F 15/16* (2006.01)
(52) U.S. Cl. ......... 709/232; 709/231; 370/282; 370/503
(58) Field of Classification Search .................. 370/464, 370/498, 503, 276, 282; 709/230, 231, 232, 709/233, 234, 245
See application file for complete search history.

(56) References Cited

U.S. PATENT DOCUMENTS

| 5,241,382 | A | | 8/1993 | Paik et al. |
| 5,915,130 | A | | 6/1999 | Kim |
| 6,105,083 | A | * | 8/2000 | Kurtze et al. ............... 710/29 |
| 6,134,607 | A | | 10/2000 | Frink |
| 6,141,691 | A | * | 10/2000 | Frink et al. .................. 709/233 |
| 6,223,211 | B1 | | 4/2001 | Hamilton et al. |
| 6,229,576 | B1 | | 5/2001 | Tarr et al. |
| 6,279,061 | B1 | | 8/2001 | Aoki et al. |
| 6,418,150 | B1 | | 7/2002 | Staats |
| 6,522,649 | B1 | * | 2/2003 | Stallkamp ..................... 370/389 |
| 6,570,624 | B2 | | 5/2003 | Cornog et al. |
| 6,665,450 | B1 | | 12/2003 | Cornog et al. |
| 7,103,006 | B2 | * | 9/2006 | Garcia et al. .................. 370/252 |
| 7,260,657 | B2 | * | 8/2007 | Matsumoto et al. ............ 710/52 |
| 2002/0009049 | A1 | * | 1/2002 | Nomura ........................ 370/229 |
| 2002/0141439 | A1 | | 10/2002 | Bardini |
| 2002/0154792 | A1 | | 10/2002 | Cornog et al. |

FOREIGN PATENT DOCUMENTS

| EP | 0873019 A2 | 10/1998 |
| JP | HEI 11-346319 | 12/1999 |
| JP | 2001-230750 | 8/2001 |
| JP | 2001-526863 | 12/2001 |

(Continued)

OTHER PUBLICATIONS

3D Sound Surge Press Release, Wired Unleashes the Power of Digital Video Streaming Media Announces Availability of Fire Wired AV and Fire Wired DV, Jan. 5, 2000.

(Continued)

*Primary Examiner* — Chi H Pham
*Assistant Examiner* — Weibin Huang
(74) *Attorney, Agent, or Firm* — Oliver Strimpel

(57) ABSTRACT

A communication protocol over the serial bus allows a peripheral device to control the flow of data between a host computer and the peripheral device so as to maintain synchronization to a periodic reference signal. The protocol involves transferring flow control messages between the peripheral device and the host computer, allowing the peripheral device to control how and when the host computer sends the uncompressed audio and video data.

25 Claims, 11 Drawing Sheets

FOREIGN PATENT DOCUMENTS

| WO | WO 99/52290 | 10/1999 |
|----|-------------|---------|
| WO | WO 00/60478 | 10/2000 |
| WO | WO 01/24479 | 4/2001 |
| WO | WO 01/26292 | 4/2001 |
| WO | WO 01/59965 | 8/2001 |
| WO | WO 01/78400 | 10/2001 |

OTHER PUBLICATIONS

Canpopus ADVC-100 Advanced Digital Video Converter Data Sheet, Nov. 2001, 2 pages.
DV-Bridge DV to/From Digital Audio-Video Codec Specification, 2 pages.
DV-Bridge DV to/From Digital Audio-Video Codec Specification, 3 pages, 1999-2001 Miranda Technologies Inc.
Dynamic Network Factory, Firewire IEEE-1394 High Performance Serial Bus, 12 pages, 1998-2002, Dynamic Network Factory, Inc.
Laird Telemedia LTM-5500 Blue Flame Pro IEEE 1394 (DV) Bi-Directional Media Converta Data Sheet, 2 pages.
Laird Telemedia Professional Firewire (IEEE 1394) Media Converters, 2 pages.
Laird Telemedia Model LTM-5500 User Manual, 2001, pp. 1-6.
Leitch Multi-Function Digital/Analog A/V Synchronizer DPS-575 Product Catalog, 2002.
MacInTouch Fire Wire Guide, 2000, 13 pages.
Miranda Technologies Inc. DV-Bridge Guide to Installation and Operation M142-9900-301, Jul. 2000, 11 pages.
Omneon Video Networks, "Technology Brief-The Omneon Video Area Network and Storage Area Networks", New Release, 2001, 3 pages.
Omneon Video Networks, Broadcast Hardware April Issue, "IEEE-1394 A Core Technology", Edward Hobson, 2001, 3 pages.
Omneon Video Networks, "Network Architectures", Peter Powell, Sep. 1999, 4 pages.
ProMax, DA-MAX Comprehensive Breakout Box AudioVideo Digital Format Converter, Data Sheet, 2 pages.
ProMax, DA-MAX Specification, 2002, 2 sheets.
ProMax DA-MAX Installation Guide Preliminary, Oct. 29, 2001, 10 pages.
PowerR, Director's Cut, Product Brochure, 3 pages.
Streaming Media and Video Professional, Firewired DV and Firewired AV press release, 2 pages.
SourceForge.net: DV Transmission over IEEE-1394, Tips and Tricks, 4 pages.
Synthetic Aperture, FireWire to Video Conversion Solutions, Data Sheet, Oct. 13, 2001, 6 pages.
TVone Multimedia Solutions, DV-2001 DV-Analog Converter, Specification, 2 pages.
TechEncyclopedia, TCP/IP abc's, 9 pages.
Videonics, Micro-PACE product brochurs, Feb. 15, 2002, 4 pages.
U.S. Appl. No. 09/054,864 Non-Final Office Action dated Jan. 3, 2007, 17 pgs.
U.S. Appl. No. 09/054,864 Final Office Action dated Jul. 2, 2007, 14 pgs.
U.S. Appl. No. 09/054,864 Final Office Action dated Jan. 28, 2008, 15 pgs.
U.S. Appl. No. 09/054,864 Final Office Action dated Jan. 6, 2009, 15 pgs.

* cited by examiner

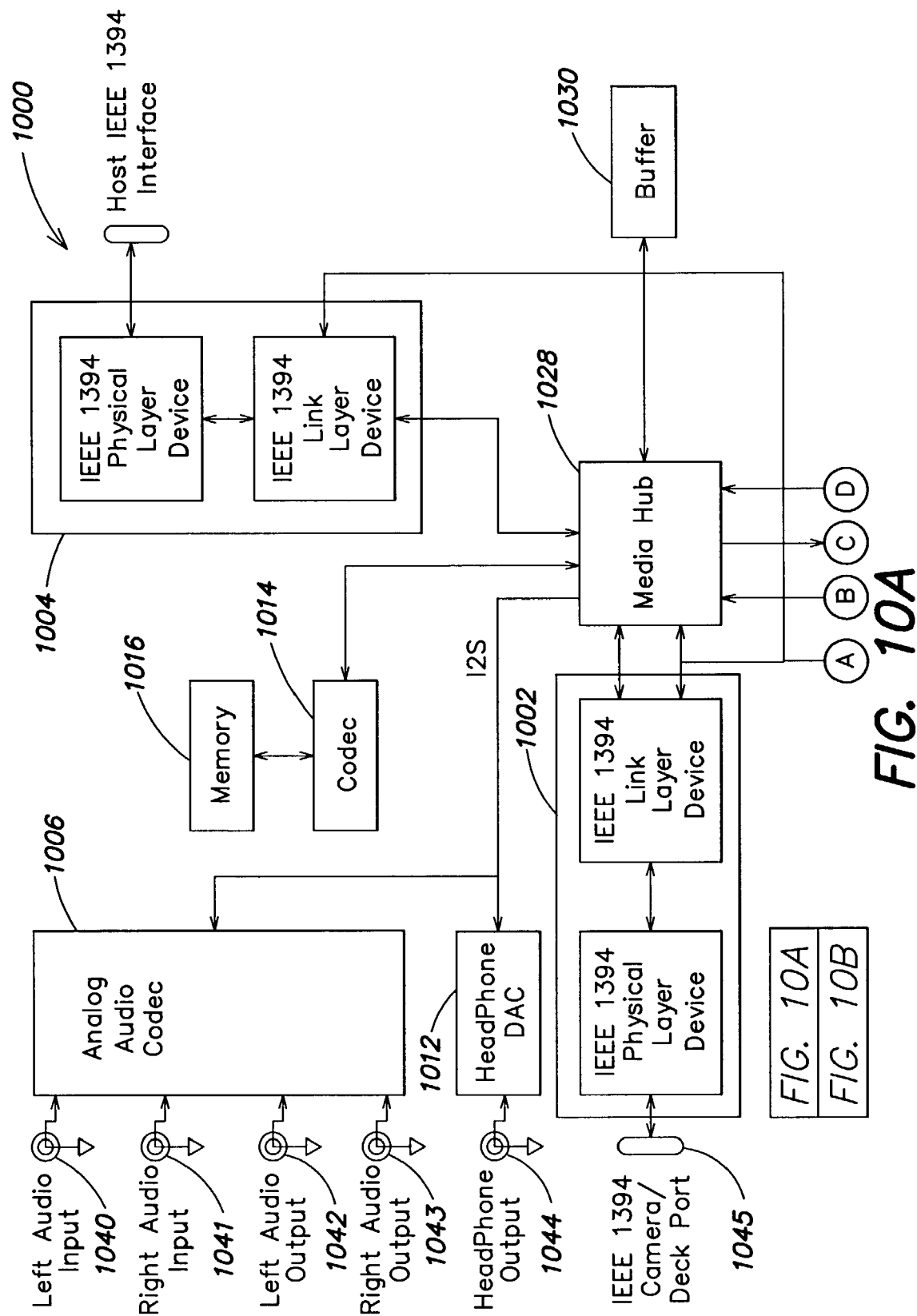

COMMUNICATION PROTOCOL FOR CONTROLLING TRANSFER OF TEMPORAL DATA OVER A BUS BETWEEN DEVICES IN SYNCHRONIZATION WITH A PERIODIC REFERENCE SIGNAL

BACKGROUND

Peripheral devices that process video and audio data commonly are connected to a host computer either to perform functions not performed by the host computer or to convert the video and audio data between digital and analog formats. The connection between the peripheral device and the host computer is typically provided by a bus over which communication is performed using packets. Example types of a bus include, a parallel bus, such as a peripheral component interconnect (PCI) bus, a serial bus, such as an IEEE-1394 compliant bus, or a computer network, such as Ethernet.

Video and audio data are typically in a standard format, such as the format described by "Specifications of Consumer-Use Digital VCR's using 6.3 mm magnetic tape" of the HD Digital VCR Conference dated December 1994, also called the "Blue Book," or by SMPTE 314M-1999 or by IEC-61834, which describe video and audio data in a format that is commonly called "DV." Video data may be compressed or uncompressed. Audio data typically is uncompressed.

An example peripheral device that processes video and audio data is a transcoder. A transcoder typically receives compressed digital video data and audio data, such as DV, over a serial bus, such as an IEEE-1394 compliant bus, and processes the data for output. In particular, the video data is converted into an analog video signal for output to a video device, such as a video monitor or camcorder. The audio data is converted into an audio signal for output to an audio device, such as a set of speakers. Such a transcoder also may receive an input analog video signal and audio signal and generate compressed digital video data and audio data, such as DV, that is transferred to the host computer over a serial bus, such as an IEEE-1394 compliant bus.

Many systems currently are available that transfer video and audio data between a peripheral device, such as a camcorder or a transcoder, and a host computer. The host computer may be used for any of a number of purposes, such as video and audio editing. When using DV, DV commonly is transferred between the host computer and a peripheral device using an IEEE-1394 compliant bus. A standard is defined for transporting DV streams over an IEEE-1394 compliant bus, called IEC-61883. In an editing system that edits stored DV and outputs DV over an IEEE-1394 bus using IEC-61883, the host first decompresses the DV, performs editing operations on decompressed data, and then compresses the results back into DV before transferring DV over the IEEE-1394 bus. This process requires resources of the host computer to be used for compression, thus limiting the real-time processing capabilities of the host computer. Thus, a DV version of the entire program often is created and stored in a data file before it is transferred from the computer to another device. Further, to produce video in any output format other than DV, such as an analog video signal, the DV version also must be decompressed first. Decompression of DV and encoding of the results in an analog video signal generally is performed by a transcoder.

An IEEE-1394 compliant device transfers data based on a local time base using what is called a bus timer clock. As a result, each device attached to an IEEE-1394 bus has its own time base, which generally is faster or slower than the time base on other devices on the same bus. Although the IEC-61883 standard provides a technique for synchronizing these clocks, different time bases generally exist on different devices on the bus due to jitter and phase differences between the clocks. A consequence of the different time bases is that a host either transmits more data packets than a transcoder can consume or transmits too few data packets to the transcoder, causing a frame to be repeated or dropped. To address this problem, a host is required to periodically send empty data packets and to use a presentation time stamp (the SYT field) in a packet of each frame. The presentation time stamp designates to the transcoder a point in time when the frame should be displayed. However, the time stamp is generated by a sender using the sender's bus timer clock, but is used by the recipient using the recipient's bus timer clock. Thus, even if the number and frequency of the transmission of the empty data packets is calculated carefully in advance of transmission, on average, the empty data packets merely extend the period of time before a frame is dropped or repeated. The use of empty data packets does not solve the problem created by the different time bases on sending and receiving devices. Another problem with time stamps is that not all commercially available devices support use of time stamps. Some devices do not send timestamps, and some devices do not attempt to process received timestamps. Because frames may be dropped or repeated using these techniques, such transcoders cannot be used to reliably generate a synchronous video signal for playback on a video monitor or for recording to tape, or to synchronize playback of audio and video material with an external synchronized video device.

Current transcoder designs also do not enable a host to connect to another device through the transcoder in a manner that allows the host to communicate directly to the other device, yet allow the transcoder to modify data in packets sent to the other device.

SUMMARY

A communication protocol is provided to allow a device that receives a periodic reference signal to control the flow of temporal data between devices over a bus to maintain synchronization of the temporal data with the periodic reference signal. Flow control messages are sent between devices, allowing a device that receives the periodic reference signal to control how and when the data is sent over the bus. For example, a peripheral device that receives a periodic reference signal may send flow control messages to a host computer to control the flow of data from the host computer to the peripheral device. Different types of temporal data, such as audio and video data, may be sent as separate data streams. Using the IEEE-1394 protocol, the flow control messages are sent using an asynchronous protocol, whereas temporal data are sent using an isochronous protocol.

Uncompressed video and audio data are transferred from the host computer over a serial bus to the peripheral device, where the peripheral device performs operations on the data, such as compressing the video data or generating an analog video signal. Video and audio data may be transferred as separate streams. By transferring uncompressed video data, the host computer does not need to consume resources to compress the video data, thus allowing those resources to be used for more creative operations on the video and audio data. Further, by transferring uncompressed video data, the peripheral device can generate video data in many output formats without first decompressing the video data. The peripheral device also may output video and audio data using a standard protocol over a standard bus. For example, the peripheral device may generate DV from the uncompressed audio and video data, and output the DV using IEC-61883 over an IEEE-1394 compliant bus.

A peripheral device that synchronizes transfer of data from the host computer with a periodic reference signal also can be used to synchronize data transfer to another device, such as a transcoder or camcorder or deck, that is connected to the peripheral device. For example, the peripheral device may encode the uncompressed audio and video data received from the host computer as a video signal. The peripheral device then outputs the video signal to the other device. The other device may provide the periodic reference signal. For example, if the other device is a camera, a composite video output signal from the camera can be used as the periodic reference signal. As a result, transfer of data from the host to the peripheral device and then to the camera is synchronized to the camera.

Such a peripheral device also allows a real time digital cut to tape to be performed. In particular, by transferring uncompressed data from the host computer to the peripheral device during playback in synchronization with a periodic reference signal, the host computer can process effects in real time. The peripheral device may generate a DV output from the uncompressed data. This DV output can be provided over an IEEE-1394 compliant bus to a recording device such as a DV deck or camcorder. If this DV deck or camcorder has a composite video output signal, then this output signal from the deck or camcorder may be used as the periodic reference signal. The peripheral device also may act as a bridge between the host computer and the other device. In particular, the peripheral device may implement a protocol over the serial bus between the host computer and the peripheral device and a protocol over another serial bus between the peripheral device and the other device. After receiving a packet at one port, the peripheral device determines if the packet is directed to a device connected on the other port or if the packet is directed to the peripheral device or if the packet is to be processed by the peripheral device to create one or more new packets to be output to the device connected on the other port. For example, the peripheral device may decompress compressed video data received from the host and output data packets that include uncompressed video data to the other device. From the perspective of the host, the peripheral device behaves as if it were the other device. From the perspective of other device, the data packets appear to be from a host device.

BRIEF DESCRIPTION OF THE DRAWINGS

FIGS. 10A-10B are a more detailed block diagram of a peripheral device incorporating the modes of operation illustrated in FIGS. 7-9.

DETAILED DESCRIPTION

Figure 1:
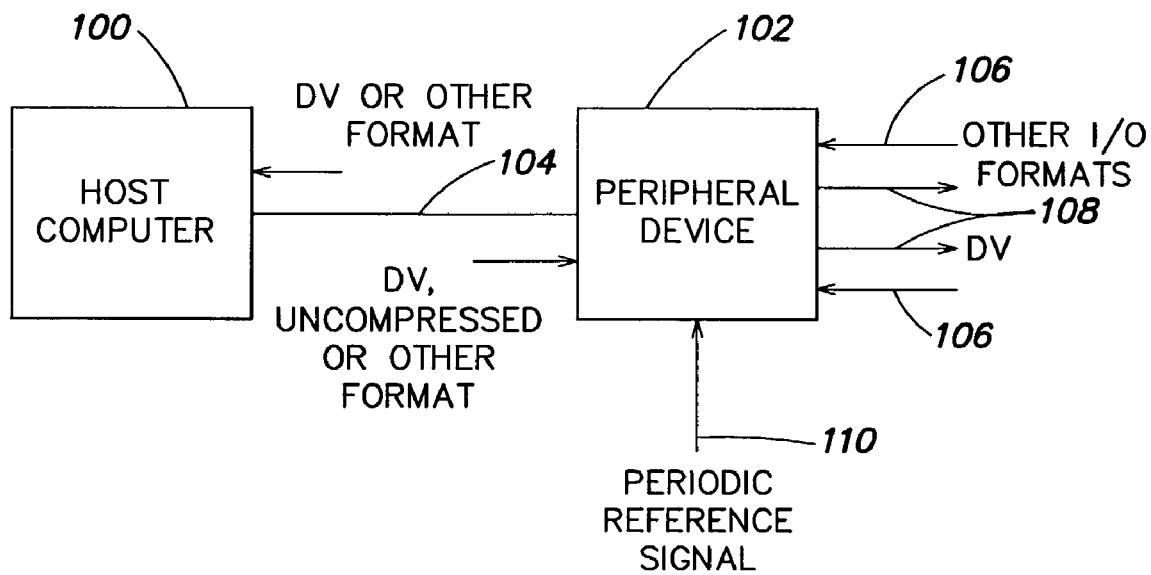
FIG. 1 is a block diagram of a system in which a host computer is connected to a peripheral device.

FIG. 1 illustrates a system in which a host computer 100 is connected to a peripheral device 102 by a bus 104, such as an IEEE-1394 compliant bus. The host computer typically includes storage for storing video data and audio data in data files using a file system of the operating system of the computer. An editing system is provided on the host computer to allow editing of a program using the video data and audio data with effects to be performed on the video data. Such an editing system typically represents a program as a sequence of clips, wherein a clip is a reference to a data file containing temporal media, and a range within the data file. A playback system also is provided for playing back the edited program in full motion at full resolution. The playback system allows an editor to view the program that has been edited. If the video data is compressed, the playback system decompresses the video data, and performs any effects on the decompressed video data.

The bus may be any type of bus over which communication is performed using packets and which can transmit data for temporal data, such as video data and audio data, at a rate faster than the sample rate of the temporal data, such as the frame rate of the video data. The host computer includes a bus interface for sending packets to and receiving packets from the device over the bus. A buffer in memory commonly is connected to transfer data to the bus interface for transmission as a plurality of packets. This buffer will receive, for example, data from the playback application for transfer to the device. A driver, a form of software that acts as a controller, for the bus interface also is on the host computer and allows the host computer to implement communication protocols, such as the protocol described herein, over the bus.

The host computer may receive data over the bus from the peripheral device. The host computer may send data over the bus to the peripheral device. The host computer and peripheral device may exchange several kinds of data including video data, audio data and other temporal data and other content. Video data may be either compressed or uncompressed, and may be combined with or separate from audio data and other related time-based media. Audio data typically is uncompressed, but may be compressed. The invention is not limited to any particular format of video data or audio data or other temporal data.

Data is transferred over the bus 104 in the form of packets. A packet is a unit of transmission of data that includes both data and routing information, such as an address of a node on the bus. A packet also may indicate a type of the packet if the communication protocol allows different types of packets to be transmitted. A packet also may include error correction codes and other data. The form and content of each type of packet typically is specified as part of a communication protocol that is described in more detail below.

The peripheral device may have several inputs 106 to receive data in any of a number of formats from a source, such as video and audio data from a tape deck. The peripheral device also may have several outputs 108 to send data in any of a number of formats to a receiver, such as video and audio data to a monitor and speakers or to a tape deck. For example, the peripheral device may send DV to a DV device, such as a DV camcorder or DV tape deck, or may receive DV from a DV device. Examples of other video and audio input and output formats include, but are not limited to, analog formats such as composite video, component video (such as YCrCb and YUV video) and S-Video, and digital formats, both compressed and uncompressed, both standard and proprietary, such as MPEG-2, SMPTE-125M, SMPTE-260M, SMPTE-264M, SMPTE265M, SMPTE-267M, SMPTE-274M, and SMPTE-279M, among others. The peripheral device also may internally generate or receive from an external source a periodic reference signal 110 for use in controlling data transfer from the host. This periodic reference signal has a rate that corresponds to the desired rate of the temporal data, such as a field or frame rate of video, that is output by the peripheral device. The periodic reference signal may be generated by an accurate crystal clock generation circuit. Such a circuit may be internal to the peripheral device or external to the peripheral device. The periodic reference signal also may be generated by using a video decoder that decodes a received composite video signal to generate a vertical synchronization signal (VSYNC), a horizontal synchronization signal (HSYNC), a pixel clock (such as 27 MHz for NTSC/PAL standard definition video) and a burst phase signal. Such a composite video signal used for this purpose is commonly called a genlock, RS170, black burst or house sync signal, and may or may not include active video. The signals output from the decoder may be provided as inputs to a video encoder to generate output video that is in synchronization with the received composite video signal.

Each field boundary or frame boundary, or other designated boundary in time that can be derived from the periodic reference signal, may be used to define a data interval. A data interval is a period of time within the temporal data that corresponds to the periodic reference signal, such as a frame or field of video data, or audio or metadata that corresponds to the frame or field of video data. The communication protocol described below utilizes a data interval as a basis for transfer of data from the host to the device to synchronize the data with the periodic reference signal.

The peripheral device may be used to capture or playback multiple streams of audio and video data for the host computer. For capture, the peripheral device receives data from one or more of its inputs and transfers the received data to the host computer over the bus. For example, the peripheral device may receive a DV stream, which it transfers directly to the host computer. The peripheral device may receive an analog video and audio stream, which it then converts to a DV stream that is transferred to the host. In the playback mode, the peripheral device receives a stream of video and audio data from the host computer over the bus. This stream may be converted into any of a number of formats for output to another device. For example, the peripheral device may convert the received stream into an analog video and audio signal or into a DV stream for transmission to a recording device or to a monitor and speakers.

Figure 2:
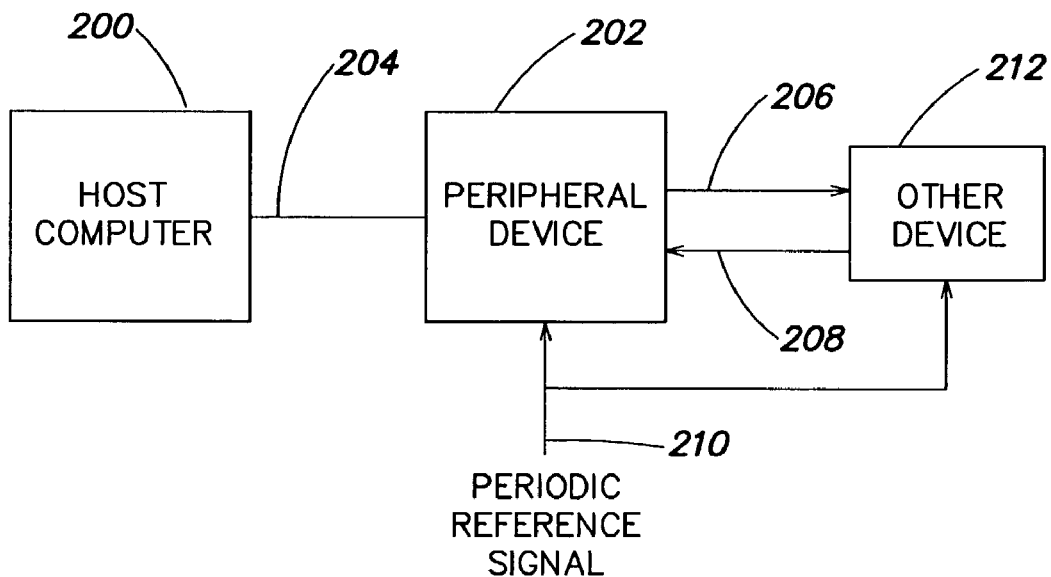
FIG. 2 is a block diagram of a system in which a host computer is connected to a peripheral device that is synchronized with another video device.

Referring to FIG. 2, the peripheral device 202 can synchronize data transfer over the bus 204, from the host computer 200 to another device 212 that is connected (via inputs 206 or outputs 208) to the peripheral device 202, to a periodic reference signal 210 that is received by both the peripheral device 202 and the other device 212. The periodic reference signal may be generated by the peripheral device 202, the other device 212, or may come from another source.

Examples of other devices 212 that may be connected to the peripheral device 202 include but are not limited to a transcoder, video display, tape deck, camera or video processing equipment. For example, the peripheral device may receive uncompressed video and audio data from the host computer. The peripheral device may generate from this data an analog video and audio signal that is synchronized with the periodic reference signal and that is output to the other device.

The various functions of the peripheral device also may be integrated within the other device to produce a single device that operates to provide the combined functions. Similarly, the various functions of the other device may be integrated within the peripheral device to produce a single device that operates to provide the combined functions. Thus, a transcoder, video display, tape deck, camera or other video processing equipment could incorporate the functions of the peripheral device as described herein. Three example operational modes for such a peripheral device include uncompressed playback mode, digital cut mode, and capture mode, as will be described in connection with FIGS. 3-5.

Figure 3:
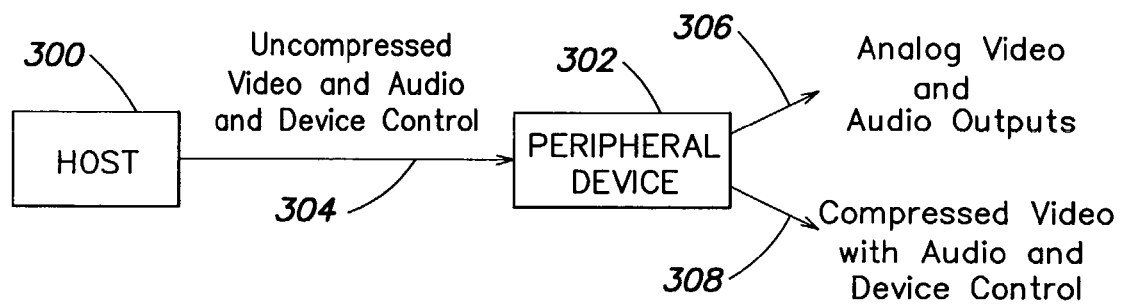
FIG. 3 is a more detailed block diagram of a mode of operation of the peripheral device as in FIG. 1.

In uncompressed playback mode, shown in FIG. 3, the host system 300 passes a stream of uncompressed video and audio and/or device control commands to the peripheral device 302 over the bus 304. For playback during editing, the uncompressed stream may be fractional frame (such as ¼-frame) or full-frame, depending on a user-defined setting. For digital cut mode discussed below, full-frame mode is the default setting. The peripheral device may include a resizer to scale fractional-frame video to full-frame video. The peripheral device may generate an analog video and audio output 306 using the uncompressed stream. A video window on the desktop of the host computer may play in synchronization with the outputs of the peripheral device. The peripheral device may create a DV or other compressed output 308 by encoding the uncompressed stream using an encoder on the peripheral device. By providing sufficient buffering, the compressed output may be kept in synchronization in spite of latencies incurred by encoding the uncompressed stream on the peripheral device.

In this mode, editing, playback and creation of output video and audio with real-time effects can be provided. In particular, because the host does not compress the video and audio stream after application of a real-time effect, the uncompressed output is transferred in real time during playback to the peripheral device, which in turn can encode the uncompressed stream for output. Such operation also allows a real time digital cut to tape to be performed. In particular, by transferring uncompressed data from the host computer to the peripheral device during playback in synchronization with a periodic reference signal, the host computer can process effects in real time. The peripheral device may generate a DV output from the uncompressed data. This DV output can be provided over an IEEE-1394 compliant bus to a recording device such as a DV deck or camcorder. If this DV deck or camcorder has a composite video output signal, then this output signal from the deck or camcorder may be used as the periodic reference signal.

Playback of video may occur in one or more of a desktop window on the host computer, composite or S-Video outputs 306 on the peripheral device, and a DV output 308 via a IEEE-1394 compliant bus on the peripheral device, or on other outputs of the peripheral device. Playback of audio may occur through one or more of the analog outputs, DV outputs or digital outputs (not shown).

Figure 4:
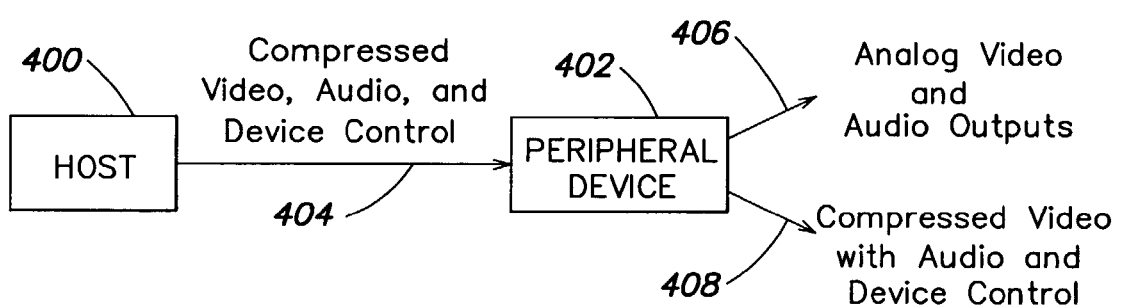
FIG. 4 is a more detailed block diagram of another mode of operation of the peripheral device as in FIGS. 1 and 2.

In another mode shown in FIG. 4, a digital cut of a compressed stream rendered by the host computer 400 and/or device control commands is provided to the peripheral device 402 over the bus 404. In this mode, any effects are rendered and the rendered images are compressed at the host computer and stored in the data files before the transfer. The compressed stream is read by the host computer 400 from its data files and transmitted to peripheral device 402. The compressed stream may be transmitted to the peripheral device using the synchronized protocol described below. The synchronized protocol is used to transfer the DV stream for playback on a synchronized device such as a television monitor.

Playback of video may occur in one or more of a desktop window on the host computer, composite or S-Video outputs 406 on the peripheral device, and a DV output 408 via the IEEE-1394 compliant bus on the peripheral device, or on other outputs of the peripheral device. Playback of audio may occur through one or more of the analog outputs, DV outputs or digital outputs (not shown). The analog outputs are created by having the peripheral device decode the incoming compressed stream using a decoder on the peripheral device, then encoding the decoded data using a video encoder. To perform a digital cut to a DV tape, the peripheral device performs device control operations on the DV device (not shown) attached to the DV output 408, and outputs the DV data directly as received from the host.

In this mode the compressed output from the peripheral device plays in synchronization with the video in the desktop window on the host computer. By providing sufficient buffering in the host, the latencies arising from decoding the DV stream and encoding the analog outputs on the peripheral device may be overcome to synchronize the analog outputs with the video in the desktop window.

Figure 5:
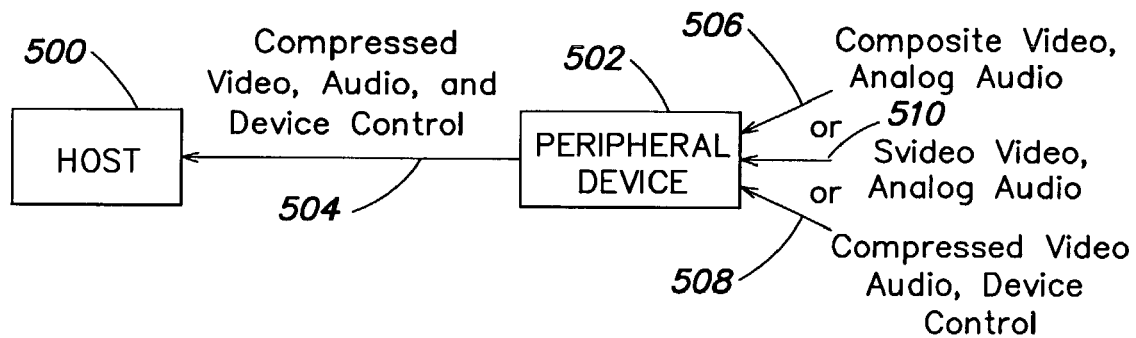
FIG. 5 is a more detailed block diagram of another mode of operation of the peripheral device as in FIGS. 1 and 2.

A third mode of operation is capture, shown in FIG. 5. Capture employs one of several different input sources (506, 508, 510) of the peripheral device 502, such as composite video, S-Video video, and DV video and audio inputs. DV device control by the peripheral device 502 is available if a DV input device is used.

If the input device is DV, then the DV stream is passed through the peripheral device directly to the host 500 over the bus 504. The DV stream may be transferred to the host system using the synchronized protocol described below. During transfer of DV data to the host computer, the peripheral device may decode the DV stream and encode the decoded data to generate an analog video and audio outputs (not shown).

If the input signal is composite or S-Video, or some other format, then the input signal is converted into a digital format, such as DV, before being transmitted to the host over the IEEE-1394 compliant bus. In this mode the analog video and audio signals also may be output through the corresponding analog video and audio outputs (not shown). Output of DV format video over the other IEEE-1394 compliant bus output 508 to an external device also may be active or inactive.

In all of these modes, the peripheral device may act as a bridge between the host computer and the other device. In other words, the peripheral device implements a protocol over the first serial bus for communication between the host computer and the peripheral device. The peripheral device implements the same protocol over the second serial bus for communication between the peripheral device and the other device. The peripheral device communicates information from the other device to the host computer to allow the host computer to communicate packets directed to the other device using the protocol over the first serial bus. The peripheral device also communicates information from the host computer to the other device to allow the other device to communicate packets directed to the host computer using the protocol over the second serial bus.

In general, the peripheral device receives messages from a host at one port of the peripheral device, translates the message, then send a message to the other device from another port of the peripheral device. The translation involves at least translating any node address in the message so that it is properly directed to the other device through the other port. Translation may also involve other processing to be performed on the data in the packet such as conversion from one data format to another.

Conversely, the peripheral device receives messages from the other device at one port of the peripheral device, translates the message, then sends a message to the host from another port of the peripheral device. Again, the translation involves at least translating any node address in the message so that it is properly directed to the host through the other port, and may involve converting data formats or other processing of the data in the message.

To implement such functionality, a separate process for managing communication on each port is executed by a microprocessor on the peripheral device. When a message is received on one port, the process for that port invokes a translator process which translate the message and sends the translated message to the other process for the other port.

Whether packets flow from the host to the other device or from the other device to the host, packets received by the host, peripheral device or other device are locally acknowledged using a low level protocol, such as the link layer protocol. However, application level acknowledgements are passed from the host to the other device, and from the other device to the host, through the peripheral device using the node translation described above. Thus, the peripheral device appears to be a virtual host from the perspective of the other device, and appears to be a virtual device from the perspective of the host.

This bridge functionality will now be described in more detail for four types of communication: from host to peripheral device, from peripheral device to other device, from other device to peripheral device and from peripheral device to host.

If a packet is received by the peripheral device from the host computer on one port, that port locally acknowledges receipt of the packet using, for example, a link layer or other low level protocol. The packet is processed to determine if the packet is directed to the peripheral device or the other device. If the packet is directed to the peripheral device, the packet is processed at the peripheral device. If the packet is directed to the other device, the packet is first processed by the peripheral device to create one or more new packets that are in turn sent to the other device.

If a packet is sent to the other device by the peripheral device by one port, the other device locally acknowledges receipt of the packet by using a link layer or other low level protocol message.

If a packet is received by the peripheral device from the other device by one port, that port locally acknowledges receipt of the packet, for example using a link layer or other low level protocol. The packet is processed to determine if the packet is directed to the host computer or to the peripheral device. If the packet is directed to the peripheral device, the packet is processed at the peripheral device. If the packet is directed to the host computer, the packet is processed by the peripheral device to create one or more new packets that are in turn transferred to the host computer.

If a packet is sent to the host by the peripheral device by one port, the host locally acknowledges receipt of the packet by using a link layer or other low level protocol message.

The local acknowledgement of packets using the low level protocol is different from acknowledgement of application level messages by the other device or by the host. If the other device is to respond to a message received from the host through the peripheral device, this response is made using an application level protocol, such as AV/C, and is handled as a message from the other device that is directed to the host through the peripheral device. Similarly, if the host is to respond to a message received from the other device through the peripheral device, this response is made using an application level protocol, such as AV/C, and is handled as a message from the host that is directed to the other device through the peripheral device.

Figure 6:
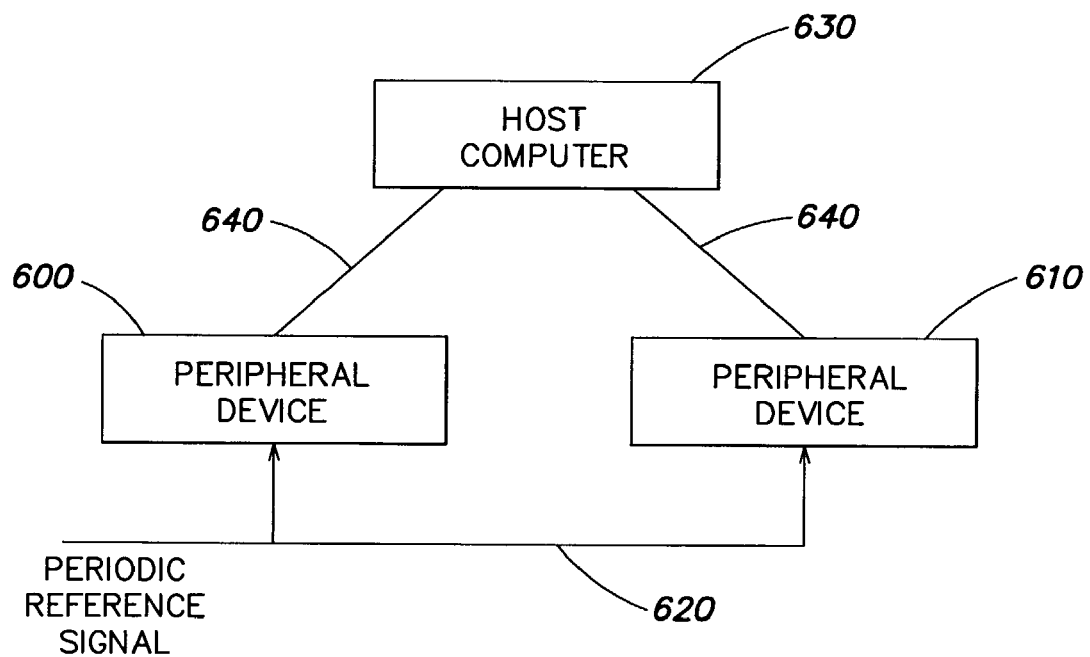
FIG. 6 is a block diagram of a mode of operation using two peripheral devices that both receive data from a host computer.

Two peripheral devices also may be connected to receive data from the same host, as illustrated in FIG. 6. In particular, a first peripheral device 600 and a second peripheral device 610 both receive a periodic reference signal 620. The first peripheral device 600 communication with a host 630 over a bus 640. The second peripheral device 610 is another node on the same bus 640. Using the command protocol described below the host computer selects one of the peripheral devices and directs it not to send flow control messages. The host computer then replies only to flow control messages from the other peripheral device. In this manner, both of the peripheral devices can provide synchronized outputs from the same data stream sent by the host computer.

Example hardware that supports each of the modes of operation described above will now be described in connection with FIGS. 7-10A-B.

Figure 7:
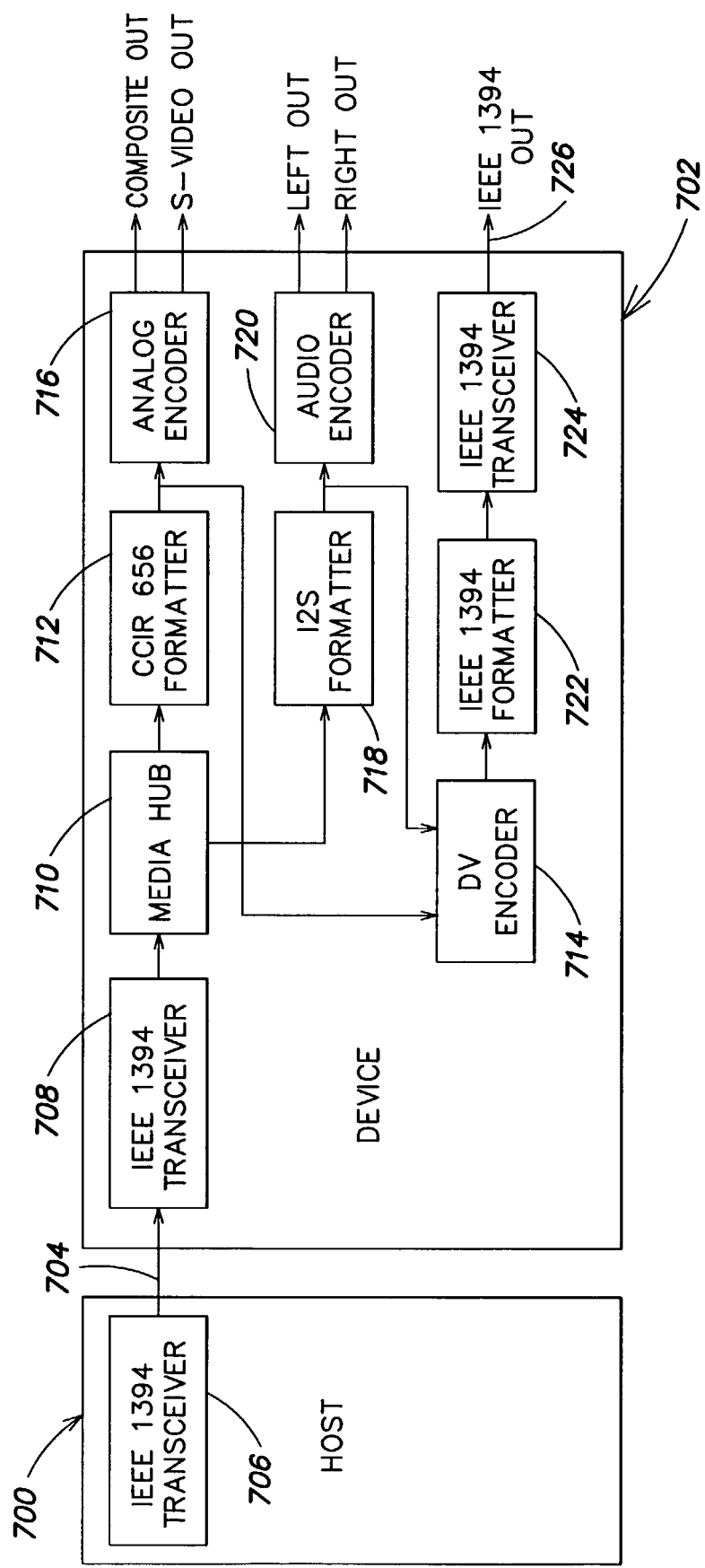
FIG. 7 is a block diagram of a peripheral device for the mode of operation shown in FIG. 3.

In uncompressed playback mode, shown in FIG. 7, the peripheral device operates as a frame buffer and DV compression device. Uncompressed audio and video data is sent by the bus interface, shown as a IEEE-1394 transceiver 706, on the host 700 over the IEEE-1394 compliant bus 704 to the peripheral device 702. The bus interface, shown as a IEEE-1394 transceiver 708, on the peripheral device 702 receives the data, and the data is stored in the media hub 710, which includes a frame buffer. The video data is then reformatted as an ITU/CCIR 656-video stream by a CCIR 656 formatter 712, which provides the reformatted data to both the DV encoder 714 as well as a video encoder 716. An I2S formatter 718 reformats the audio data into an I2S audio stream for transport to both an audio encoder 720 and the DV encoder 714. The DV stream output by DV encoder 714 may be provided to an IEEE-1394 formatter 722 to produce IEEE-1394 packets that may be output over another IEEE-1394 compliant bus 726 by another IEEE-1394 transceiver 724.

To prevent dropping or adding video frames in the video provided to the CCIR 656 formatter 712 during playback of video over the IEEE-1394 compliant bus 704, the peripheral device controls the flow of data from the host computer 700 to the peripheral device 702. This flow control also allows the peripheral device to generate and output a synchronous video signal using the analog encoder 716 that is synchronized with an internal or external periodic reference signal. A communication protocol to implement this flow control is described in more detail below.

Figure 8:
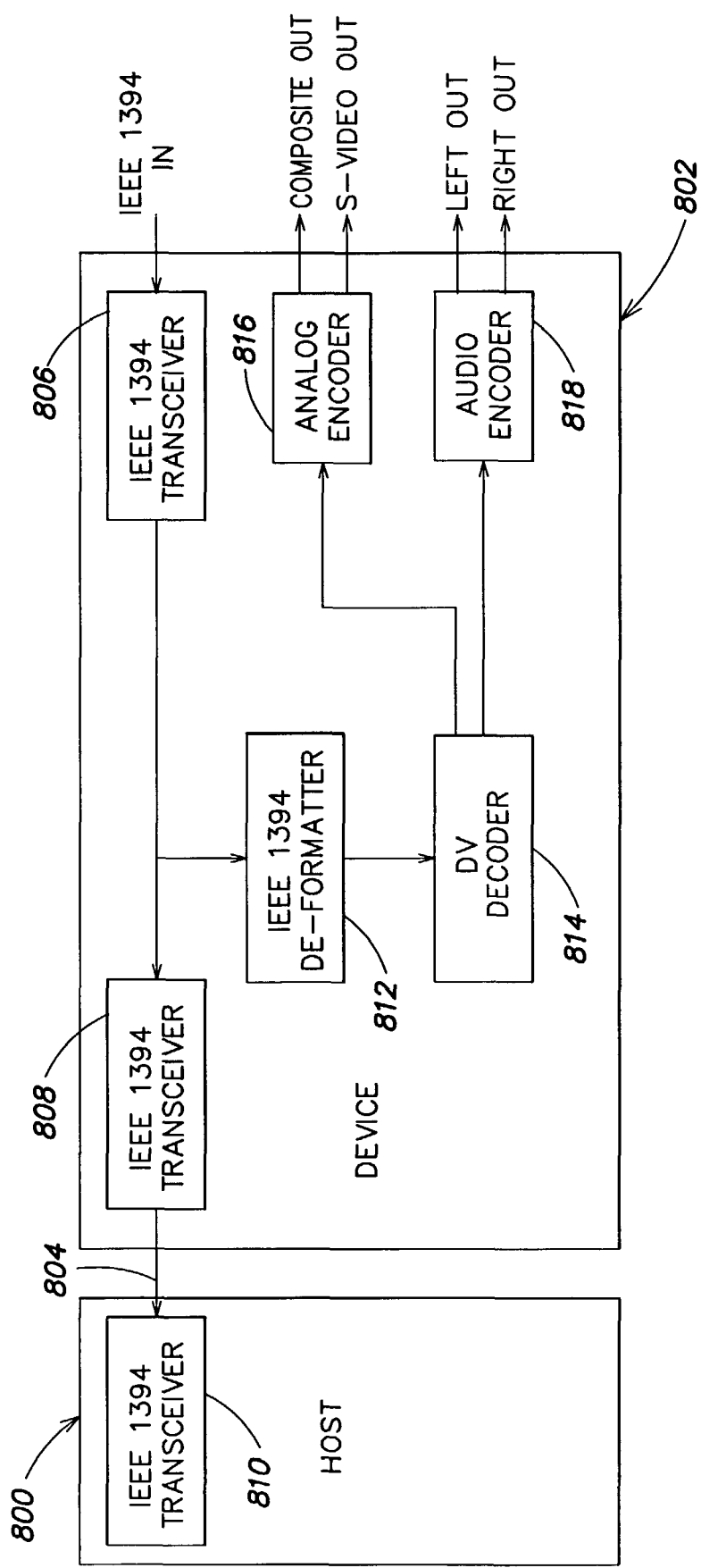
FIG. 8 is a block diagram of a peripheral device for the mode of operation shown in FIG. 5.

In digital capture mode, shown in FIG. 8, the peripheral device 802 operates as both a buffer and a decoder. Digital video and audio data, such as DV, is received from a device (not shown) and is passed to the host computer 800 for processing and storage on a storage device accessed by the host computer, such as a disk system. The received data, if compressed, also may be decompressed to produce output audio and video for monitoring. More particularly, in FIG. 8, data, such as DV, is received through an IEEE-1394 interface 806, is buffered and sent by another IEEE-1394 interface 808 over the bus 804 to the IEEE-1394 interface 810 at the host 800.

The received data also may be deformatted by IEEE-1394 deformatter 812 and input to a decoder 814, such as a DV decoder, to be decompressed. The decompressed data then can be encoded for output to other devices. For example, the decompressed data may be input to an analog video encoder 816 and the audio data may be input to an audio encoder 818. The outputs of the encoders can be applied to a monitor and speakers for monitoring of the capture process. Because the timing on the analog video encoder 816 is derived from a local time base and is asynchronous to the incoming DV data, the analog encoder 816 may either repeat a frame of video or drop a frame of video depending on whether the incoming DV data steam is running slower or faster than the video encoder.

Figure 9:
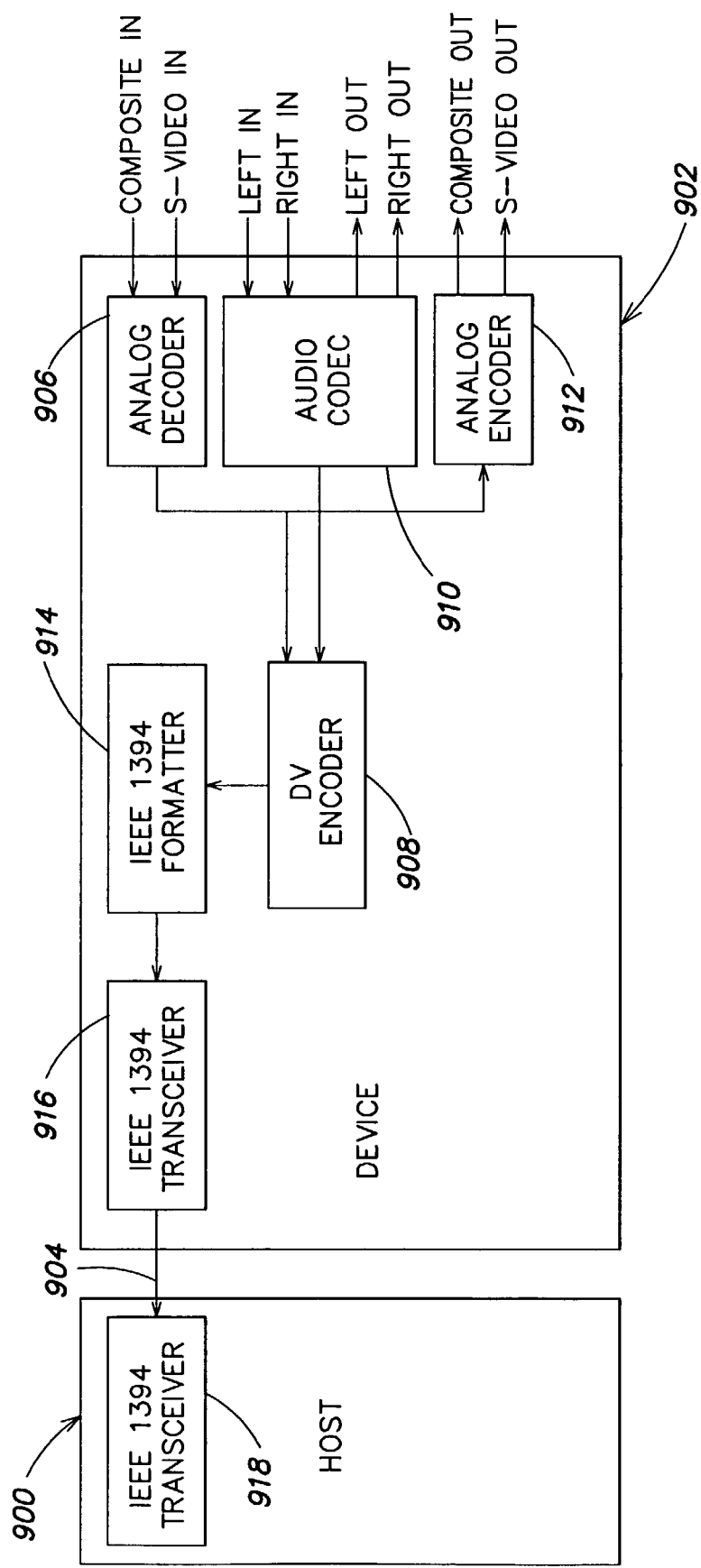
FIG. 9 is a block diagram of a peripheral device for the mode of operation shown in FIG. 5.

In analog capture mode, shown in FIG. 9, the peripheral device 902 converts input analog video and associated audio into digital format, and transfers the digital data to the host 900 over the bus 904. For example, an analog video decoder 906 converts the input analog video into a digital ITU 656-video data stream. The digital video data is sent to a encoder 908, such as a DV encoder, for compression. Received audio is connected to an audio encoder/decoder 910 for conversion to an I2S digital audio format. The audio data also may be provided to encoder 908 for compression. The audio encoder/decoder 910 also may provide audio outputs for monitoring the audio during capture. A video encoder 912 also may provide a video output for monitoring the video during capture. Encoded video data from encoder 908 is the formatted by an IEEE-1394 formatter 914, which prepares it for transmission by the bus interface, shown as IEEE-1394 transceiver 916. The host receives the data over the bus 904 through the bus interface, shown as IEEE-1394 transceiver 918.

Figure 10B:
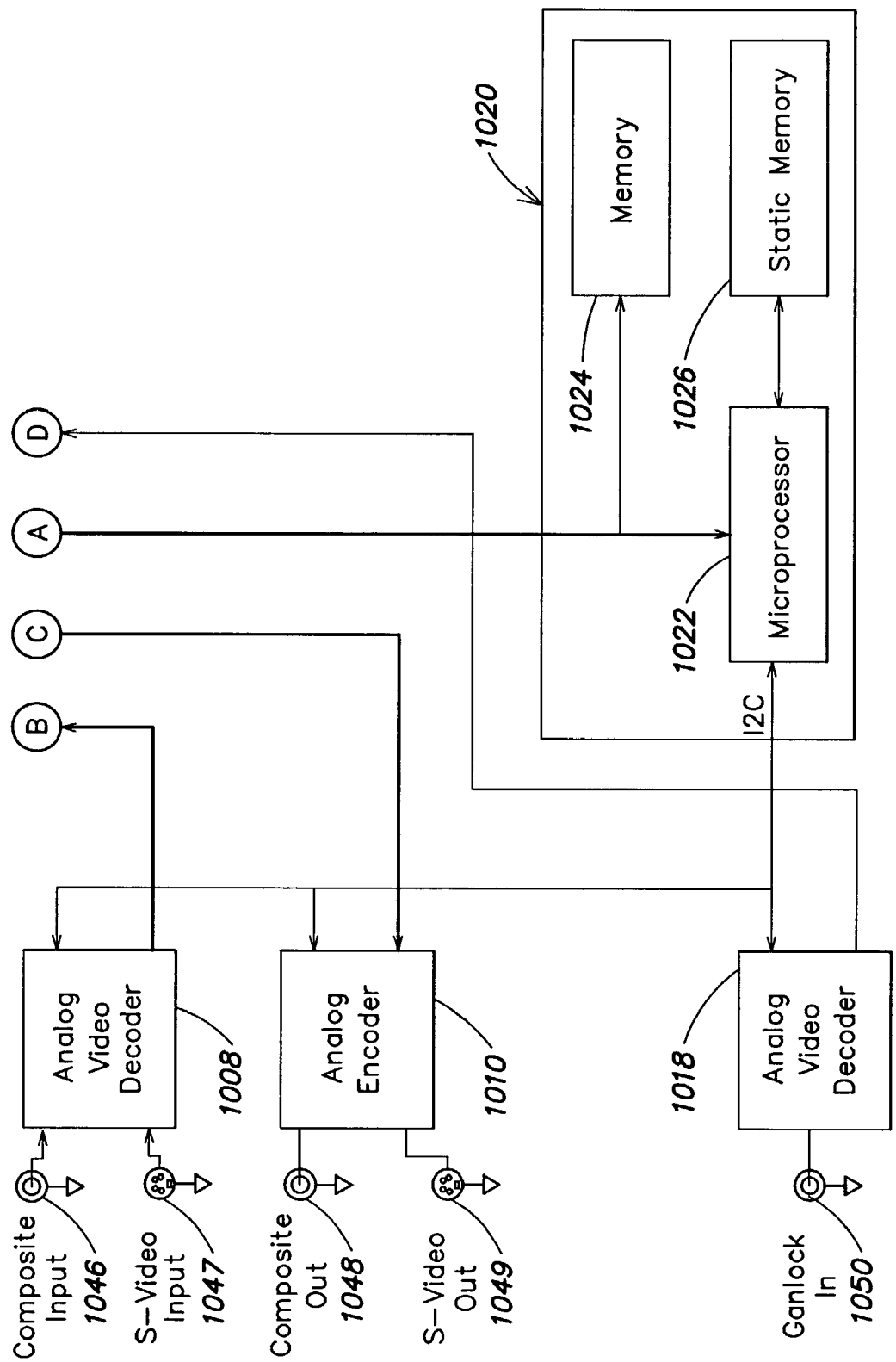

A block diagram of a peripheral device that has these modes of operation is shown in FIGS. 10A-10B. In FIGS. 10A-10B, the peripheral device 1000 operates in two basic modes: capture and playback. In capture mode, digital video and audio data, such as DV, may be received by an IEEE-1394 compliant interface 1002 and sent to the host over an IEEE-1394 interface 1004 to a corresponding interface 1051 on the host. Analog audio and video also may be received and converted to a digital format and then sent to the host over the interface 1004. In playback mode video and audio data is received from the host through interface 1004 and is output as analog video and audio and/or is output as digital video and audio data through the IEEE-1394 compliant interface 1002. The IEEE-1394 compliant interface 1002 provides an interface through port 1045 to external devices, such as cameras and decks, whereas the IEEE-1394 compliant interface 1004 provides an interface to the host computer. The interfaces 1002 and 1004 can be implemented, for example, using a physical layer device and a link layer device. A Texas Instruments TSB12LV32 Link-Layer Controller and a TSB41LV01 Cable Transceiver/Arbiter can be used to achieve a 400 megabit per second nominal transmission rate over the IEEE-1394 bus.

Left and right audio inputs and outputs 1040, 1041, 1042, 1043 for audio processing provide inputs to an audio encoder/decoder 1006, which may be implemented, for example, using a Philips UDA1345TS, which supports 32, 44.1 and 48 kHz rates. Other chips supporting other rates can be used. To keep the audio locked to the video during capture, the audio clock is derived from the input video decoder 1008. For playback or output the audio clock is derived from the analog video encoder 1010.

A headphone audio output 1044 may be provided through an encoder 1012, which may be implemented, for example, using a Philips UDA1320ATS audio digital to audio converter (DAC), which supports 32, 44.1 and 48 kHz rates. Other chips supporting other rates can be used. A separate DAC may be used for the headphone to allow adjustment to the headphone volume without affecting the main audio outputs.

The peripheral device 1000 may receive analog video through inputs 1046 and 1047, such as composite and S-video inputs. These inputs are received by a decoder 1008 which converts the input signal into digital video data. The decoder 1008 may be implemented, for example, by a Philips SAA7114H video decoder, which supports NTSC, NTSC-j and PAL analog video formats. Other decoders supporting the same or other formats may be used. If connected to either a composite or S-Video source, this decoder converts the incoming analog signal into a standard ITU 656 YUV 4:2:2 digital video data stream. This decoder also provides support for luminance offset control, luminance contrast control, chrominance saturation control and chrominance hue control.

The peripheral device 1000 also may output analog video through outputs 1048 and 1049, such as composite and S-video outputs provided by an encoder 1010. The encoder 1010 may be implemented, for example, by an Analog Devices ADV7176 encoder. The encoder 1010 accepts a YUV 4:2:2 digital video stream and real time control stream information from the genlock circuit 1018, buffered through a media hub 1028, to generate synchronized analog composite and S-Video outputs. The ADV7176 device encodes analog video and provides several functions for processing the output video, such as luminance filters (Low-Pass/Notch/Extended) control, subcarrier frequency and phase control and luminance delay control.

The peripheral device 1000 also may include a compression/decompression device (codec) 1014, such as a DV codec. This codec may be implemented, for example, using a Divio NW701 DV25 codec for both decompressing and compressing a DV data stream. In compression, the codec 1014 receives an ITU 656 YUV 4:2:2 digital video stream and an I2S audio stream and compresses it to produce a DV compressed video stream. In decompression, the codec 1014 receives a DV compressed video stream and produces both an ITU 656 YUV 4:2:2 digital video stream and an I2S audio stream. The NW701 codec also provides NTSC (4:1:1), PAL (4:2:0) and PAL (4:1:1) processing, audio support for 48, 44.1 and 32 kHz (12 and 16 bit), and optional low data-rate modes, including 3.0, 2.4, 1.8, 1.5 and 1.0 Mbytes/sec. The codec 1014 uses a memory 1016 for storing data temporarily during processing. Such a memory 1016 may be implemented, for example, using a 256K×32 DRAM.

The peripheral device 1000 also may receive a periodic reference signal (genlock) through an input 1050. This signal is received by a video genlock device 1018, which may be implemented, for example, using a Philips SAA7113 decoder. This decoder supports NTSC, NTSC-j and PAL analog video formats. If connected to a composite genlock source it extracts the vertical synchronization, horizontal synchronization and color burst phase information and provides this information to the media hub 1028, which can be used to lock the output timing of the ADV7176 video encoder 1010 to the genlock source.

Controls may be provided on the peripheral device to allow an individual to adjust the various controls of the input decoders and output encoders, particularly to adjust levels of the analog video signals, for audio muting and for adjusting gain levels of the audio signals.

A frame buffer controller, resizer and data router, herein called a "media hub" 1028, and associated buffer 1030 provide four basic functions on the peripheral device 1000. First, they buffer both uncompressed and compressed data streams between the inputs and the outputs. Second, they provide a switching or multiplexing function that routes data among the inputs, outputs, encoders and decoders. Third, they de-format incoming IEEE-1394 compliant data streams and ITU-656 compliant video streams. Fourth, they format out going IEEE-1394 compliant data streams and ITU-656 compliant video streams. The media hub 1028 may be implemented, for example, using a field programmable gate array (FPGA) with a local memory, such as an SDRAM as its associated buffer 1030.

The functions of the media hub 1028 are performed in connection with a microcontroller subsystem 1020. The primary function of the microcontroller subsystem is to provide an abstraction layer for software commands received over the host IEEE-1394 compliant interface 1004 and for controlling the IEEE-1394 compliant interface 1002. The microcontroller subsystem also provides support for setting up and controlling the video and audio encoders and decoders 1006, 1008, 1010, 1012 and 1018. The microcontroller subsystem 1020 includes a microprocessor 1022, which may be implemented, for example, using a Motorola MPC5307 microprocessor. The microprocessor 1022 operates in accordance with instructions stored in the flash memory 1024 and static random access memory 1026. In particular, an actual operating system with a real-time kernel can be provided for the microcontroller, such as the NUCLEUS operating system from Accelerated Technology, Inc., the embedded systems division of Mentor Graphics and located in Mobile, Ala.

Operation of the microcontroller will now be described in more detail. The microcontroller receives commands from the host through a command protocol described in more detail below. These commands allow the host to set the mode of operation of the peripheral device. These modes include settings for the expected audio and video format for input and output. Example format mode settings include PAL and NTSC for video and 48 KHz, 44.1 KHz or other rate for audio. For these modes, the host may designate a format to the microcontroller. The microcontroller in turn sets various registers of the input and output devices to handle the desired format.

Other modes indicate whether the host is receiving data from or providing data to the peripheral device. Some example modes include, but are not limited to:

DV input to peripheral device and DV output to host
DV input to peripheral device and uncompressed output to host
Composite input to peripheral device and DV output to host
Composite input to peripheral device and uncompressed output to host
Uncompressed input from host and composite output
Uncompressed input from host and DV output
DV input from host and composite output
DV input from host and DV output.

In a mode in which DV is input to the peripheral device and DV is output to the host computer, packets are received through interface 1002 and stored in the memory 1030 by media hub 1028. When a packet becomes available in the memory 1030, the media hub 1028 notifies the interface 1004. Interface 1004 then transfers the packet to the host. In this mode the device acts as a bridge.

In a mode in which DV is input to the peripheral device and uncompressed data is output to the host computer, packets are received through interface 1002 and stored in the memory 1030 by media hub 1028. Packets are allowed to accumulate in the memory 1030 until a frame of image data is received.

The media hub 1028 then directs the DV codec 1014 to read the frame of data from memory 1030 into its memory 1016. The DV codec then generates an uncompressed frame. The uncompressed frame is placed in another portion of the memory 1030. When an uncompressed frame is available in the memory 1030, the media hub 1028 notifies the interface 1004. The interface 1004 then transfers the image as multiple packets to the host. In this mode the device acts as a bridge.

In a mode in which a composite input is received by the peripheral device and DV is output to the host computer, the decoder 1008 produces digital video information which is stored in the memory 1030 by the media hub 1028. When a frame of image data has been received, the media hub 1028 directs the DV encoder 1014 to read the frame of data from memory 1030 into its memory 1016. The DV encoder then generates DV and places the data in another portion of the memory 1030. The media hub 1028 notifies the interface 1004 that data is available. The interface 1004 then transfers the DV image as multiple packets to the host.

In a mode in which a composite input is received by the peripheral device and uncompressed data is output to the host computer, the decoder 1008 produces digital video information which is stored in the memory 1030 by the media hub 1028. As image data is received, the media hub 1028 directs the interface 1004 that data is available for transfer. The interface 1004 then transfers packets of uncompressed data to the host.

In a mode in which the peripheral device receives uncompressed data from the host and outputs a composite analog video signal, the media hub 1028 directs packets received through interface 1004 to be stored in the buffer 1030. As data becomes available in memory 1030, the media hub 1028 directs data to the encoder 1010 for output.

In a mode in which the peripheral device receives uncompressed data from the host and outputs DV to another device, the media hub 1028 directs packets received through interface 1004 to be stored in the buffer 1030. As a frame of uncompressed data becomes available in the memory 1030, the media hub 1028 notifies the DV codec 1014 which reads the data into its buffer 1016. The DV codec then generates DV which is stored into the memory 1030. The media hub 1028 then notifies the interface 1002 that DV data is available. The interface 1002 reads the data and transfers it as packets through the output 1045. In this mode the device acts as a bridge.

In a mode in which the peripheral device receives DV input from the host and provides a composite analog video output signal, the interface 1004 receives packets of DV data that are stored in the memory 1030. When a frame of data is available, the media hub 1028 notifies the DV codec 1014, which then reads the data into its memory 1016. The DV codec then produces uncompressed video data which is stored in memory 1030. The media hub 1028 the provides the uncompressed video data to the analog encoder 1010 for output.

In a mode in which the peripheral device receives DV input from the host and outputs DV to another device, the interface 1004 receives packets of DV data that are stored in memory 1030 by media hub 1028. The media hub 1028 notifies the interface 1002 when packets are available for output. The interface 1002 then reads the packets from the memory 1030. In this mode the device acts as a bridge.

During each of the modes described above, corresponding audio input and output may be provided. Also, a composite or S-video output may be provided by the peripheral device to allow monitoring by an external monitor. Each device 1002, 1014 and 1004 may have a direct memory access (DMA) engine to access the memory 1030.

In some modes, the uncompressed video data may be received or output in ¼ frame size. In these modes, the media hub 1028 also performs a resize function.

In some modes, multiple outputs may be provided by the peripheral device. For example, the peripheral device may output DV, composite and S-video using an uncompressed input from the host. Instead of DV, the peripheral device may input or output other digital video formats, whether compressed or uncompressed. Instead of composite, the peripheral device may input or output other analog video formats. Multiple outputs also may be provided by the peripheral device, in which operations from the above described modes would be performed in parallel.

The peripheral device also may include a bus connector connected to a data path to the media hub 1028 to allow other devices to connect to the media hub to transfer audio and video data through the peripheral device. This bus connector could be used to allow other processing devices both to provide data to and to receive data from the peripheral device. For example, such a device could receive a high definition video signal and convert it into a compressed data stream which is then transferred to the peripheral device for input to the host computer.

A communication protocol for controlling communication between the host computer and the peripheral device will now be described. This protocol is divided into two parts, a data transport protocol and a control protocol. The data transport protocol defines how temporal data, such as video, audio and associated metadata, are transferred from the host system to the peripheral device, or from the peripheral device to the host system. The data transport protocol includes both data format and synchronization rules. The control protocol defines how the host system queries and controls the states, modes, and operating parameters of the peripheral device. These protocols are described in more detail below.

The communication protocol is built on parts of the IEEE-1394 high-speed serial digital bus standard and conforms with the following standards documents, which are hereby incorporated by reference: IEEE 1394-1995 Specification IEEE 1394 A Specification. The communication protocol is designed to work with standard IEEE-1394 compliant hardware bus controllers. However, for certain video data formats (e.g.: uncompressed, full-frame, 2-field, 4:2:2) the host and peripheral device controllers support a 400 Mb data rate.

The protocol used to control external devices (such as DV camcorders and VTRs) is known as AV/C, or Audio/Video Control. The specification and command set are defined in the following documents, which are hereby incorporated by reference: AV/C Digital Interface Command Set, General Specification, and Version 3.0AV/C Tape Recorder/Player Subunit Specification, Version 2.1. An example data transport protocol will now be described in more detail. In this example, the data-transport protocol is used to transmit streams of video and audio over an IEEE-1394 compliant bus between a host system and a peripheral device. This protocol is sufficiently flexible to allow for expansion for transmission of metadata as well.

In the following description of the protocol, the host computer is called the host and the peripheral device is called the device. Depending on the mode in use, the host can transmit (for digital cut mode) or receive (for capture mode). The transmitting device is called the talker and the receiving device is called the listener. The term host should be understood to indicate any apparatus that can send or receive data. The term device should be understood to indicate any device that can send or receive data that also processes a periodic reference signal.

Data transmission is performed in intervals, called data intervals, that correspond to a rate of the periodic reference signal to which temporal data is to be synchronized. For example, if the periodic reference signal corresponds to video, the data interval corresponds to an image, typically a frame, of video data. Example frame intervals include, but are not limited to, 29.97 FPS (for NTSC (525-line) systems) and 25 FPS (for PAL (625-line) systems).

Data is transmitted in the form of a series of concurrent streams, each identified by a unique stream identifier defined by the protocol. During transmission, streams can be started and stopped at any sample corresponding to a data interval, such as a frame boundary in the video data. The streams of data are broken down into segments based on the data interval in effect. Because of the nature of IEEE-1394 protocol, each data stream is further divided into a series of one or more packets for transmission during a given data interval.

For each data interval, the talker can choose to transmit any combination of streams that the listening device accommodates. For example, assuming that the listening device can accept two fields of video and two channels of audio, the talker could choose to just send audio or just video, or nothing at all. The listener takes a default action if a stream is missing. For example, if one or more audio streams are missing, which may occur if the audio channel is muted, then the listener fills silence on those channels. If the video data is omitted, which may occur in off speed playback, then the listener might repeat the last frame it received.

A data transmission includes several types of packets. A "synchronization packet" is sent from the device to the host indicating that a new data interval has begun. The talker then may send data. In one embodiment, a "preamble packet" is sent from the talker to indicate to the listener which streams will be transmitted during the data interval, in what order they will be sent, and how many packets will be used to transport each stream. Zero or more "data packets" then are sent from the talker, based on the information given in the preamble. The talker then waits for the next data interval to send more data. For example, the talker may send zero or more "null packets" to fill bus cycles on an IEEE-1394 interface until the next data interval begins. This sequence of packets is repeated for each data interval.

Preamble, data, synchronization, and null packets may use the streaming packet modes of the IEEE-1394 protocol. The IEEE-1394 specification allows for two types of streaming packets: isochronous and asynchronous. For both types, the packet format is the same, utilizing the same transaction code (tcode=0×A). Asynchronous stream transmissions are similar to isochronous transmissions, but there are the following differences. Asynchronous stream packets are transmitted during the asynchronous bus time, whereas isochronous stream packets are transmitted during the isochronous bus interval. Asynchronous stream packets are limited to a maximum payload of 2048 bytes, whereas isochronous stream packets may contain as many as 4096 bytes.

The synchronization packet is sent by the peripheral device to indicate that a data interval has begun. The peripheral device generates the synchronization packet in response to the periodic reference signal. More particularly, a synchronization packet is sent at the beginning of each data interval corresponding to the periodic reference signal. The beginning of a data interval may be detected, for example, by monitoring the periodic reference signal. An interrupt or other signal may be issued to the microcontroller of the device when then beginning of a data interval is detected.

Figure 11:
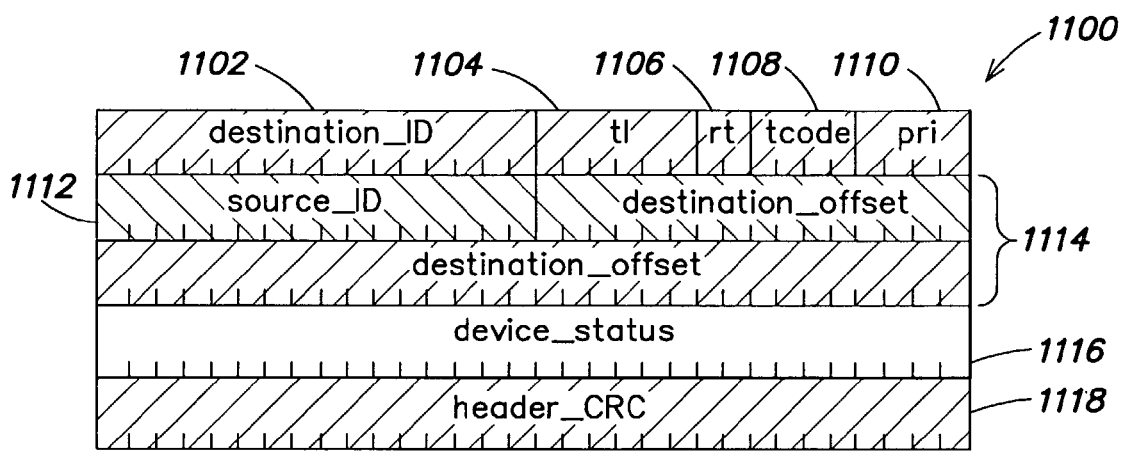
FIG. 11 illustrates an example synchronization packet format.

An example format for a synchronization packet 1100, as an asynchronous packet, is shown in FIG. 11, and has a format that corresponds to a Write Request packet. The shaded fields indicate those defined by the IEEE-1394 standard. The "destination_ID" field 1102 includes a 16-bit address of the node that is to receive the packet. This field includes a destination_bus_ID (upper 10 bits) and a destination_node_ID (lower 6 bits). To broadcast the synchronization packet to all nodes on the local bus, the destination_bus_ID is set to 3FFh and the destination_node_ID is set to 3Fh. The "tl" field 1104 is the transaction label which is a field that is set by the host. The "rt" field 1106 is the retry code, specifying whether the packet is a first attempt (00b) or a successive retry of the same command (01b through 1b). The "tcode" field 1108 specifies the 1394 transaction code for the packet and is set to "1h", which indicates that this packet is a Write Request packet. The "pri" field 1110 represents a priority code in the IEEE-1394 standard, but is not used. The "source_ID" field 1112 is the address of the node that is sending the packet. The "destination_offset" field 1114 specifies the 48-bit address location on the target that is being accessed. A specific register may be set aside in each possible destination for receiving synchronization packets. This field 1114 shall contain the address of that register. The "device_status" field 1116 is the data sent by the packet and includes information regarding the reception of the previous frame, and the general status of the device. A field that enables error detection and correction ("header_CRC" 1118) also may be included.

Figure 12:
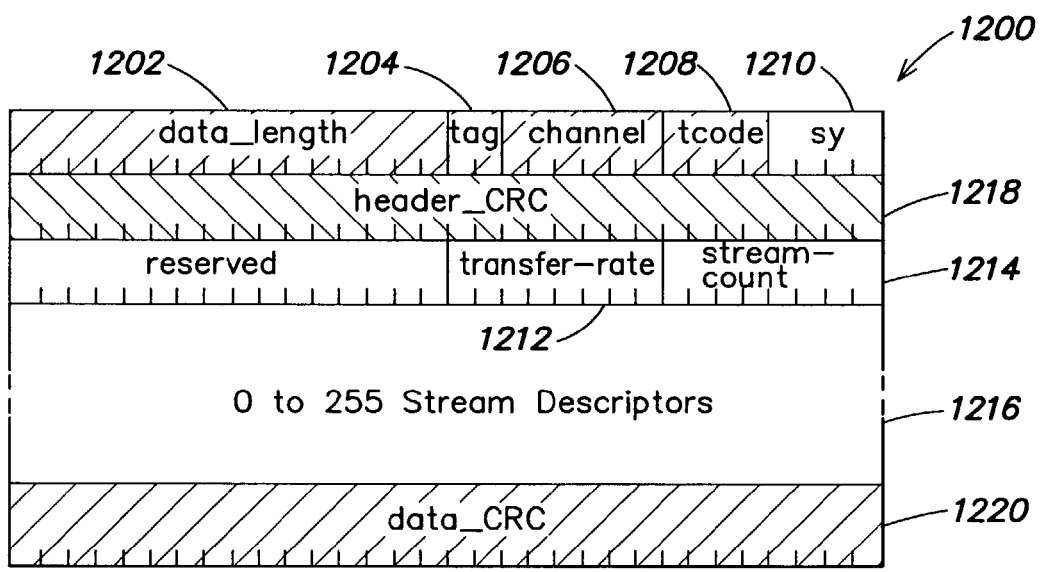
FIG. 12 illustrates an example preamble packet format.

The preamble packet is transmitted by the talker at the beginning of each data interval as a single packet. It may be transmitted as an isochronous packet. This packet specifies which streams will be transmitted during the data interval, and how many packets to expect for each stream. The talker transmits a preamble packet for a data interval even if no stream is to be sent. An example format for a preamble packet 1200 is shown in FIG. 12. The shaded fields indicate those defined by the IEEE-1394 standard. The "data_length" field 1202 includes the length in bytes of the payload section of the isochronous packet. The "tag" field 1204 includes the value 00b which indicates that the data is unformatted. The "channel" field 1206 includes a value that indicates the channel assigned to the talker and listener for transmission of this packet. The "tcode" field 1208 includes the value 1010b which indicates that this packet is a streaming packet. The "sy" field 1210 includes the value 0001b to indicate that this packet is a preamble packet. The "transfer rate" field 1212 indicates the rate at which the stream data is arriving in comparison to its real time rate, and is represented by one byte. In other words, it specifies how many frames will be transmitted during this frame time. Example transfer rates are 1×, 2× and 4× real time. The "stream count" field 1214 is an unsigned integer that indicates how many streams will be transmitted per frame during the current data interval. This value is represented by one byte. A number of stream descriptors 1216 follows this quadlet equal to the count specified by the product of the transfer rate field and the stream count field. The list of stream descriptors specifies which streams will be transmitted during this data interval, in what order they will be transmitted, and how many packets are used for each stream. The preamble packet also may include fields that enable error detection and correction ("header_CRC" 1218 and "data_CRC" 1220).

Figure 13:
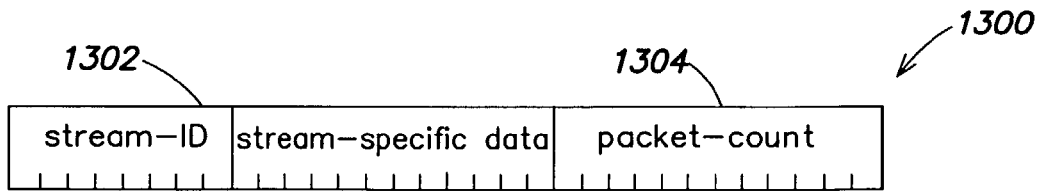
FIG. 13 illustrates an example stream descriptor format.

An example format for stream descriptor 1300 is shown in FIG. 13. The "stream ID" field 1302 identifies the type of stream, for example using an 8-bit unsigned integer. The "packet count" field 1304 specifies how many packets will be used to transmit the stream, for example using a 12-bit unsigned integer. Bits in fields marked as "stream-specific-data" in the preamble and stream descriptors are set to zero for the video fields, video frames, system and auxiliary streams. For each audio stream, this value is an unsigned 12-bit integer representing the number of audio samples in the data interval. The total number of data packets which will follow the preamble is the sum of all of the "packet count" fields in the stream descriptor list.

Figure 14:
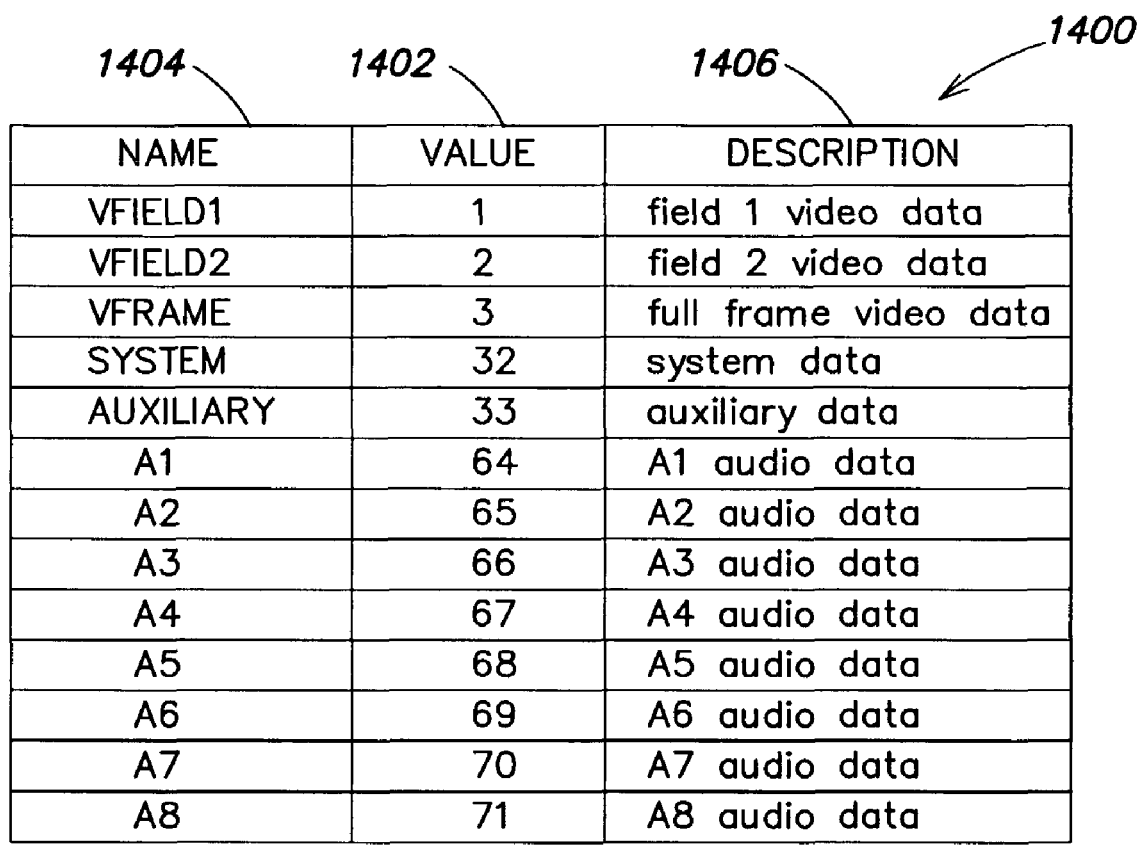
FIG. 14 is a table of stream identifiers.

Example values for stream identifiers for the "stream ID" field are illustrated in the table 1400 of FIG. 14. The stream identifiers in this example do not indicate the format of the data itself (e.g.: uncompressed or DV or JFIF). Instead, the format of the data is established before transmission begins using the control protocol. In this table, each row represents a stream identifier. The "value" column 1402 represents the value that is used as a "stream ID" in a stream descriptor packet. The "name" 1404 and "description" 1404 columns serve to further describe the stream identifier and may be used to reference the stream identifier. The following table illustrates example definitions for preambles for different types of video data, specifically DV25, DV50, IMx and uncompressed data, including a list of descriptors for each type.

| name | transfer-rate | stream-count | descriptors |
| --- | --- | --- | --- |
| DV25/DV50 @ 1X | 1 | 1 | VFRAME |
| DV25/DV50 @ 2X | 2 | 1 | VFRAME |
|  |  |  | VFRAME |
| DV25 @ 4X | 4 | 1 | VFRAME |
|  |  |  | VFRAME |
|  |  |  | VFRAME |
|  |  |  | VFRAME |
| IMX @ 1X | 1 | 10 | SYSTEM |
|  |  |  | VFRAME |
|  |  |  | A1 |
|  |  |  | A2 |
|  |  |  | A3 |
|  |  |  | A4 |
|  |  |  | A5 |
|  |  |  | A6 |
|  |  |  | A7 |
|  |  |  | A8 |
| IMX @ 2X | 2 | 10 | SYSTEM |
|  |  |  | VFRAME |
|  |  |  | A1 |
|  |  |  | A2 |
|  |  |  | A3 |
|  |  |  | A4 |
|  |  |  | A5 |
|  |  |  | A6 |
|  |  |  | A7 |
|  |  |  | A8 |
|  |  |  | SYSTEM |
|  |  |  | VFRAME |
|  |  |  | A1 |
|  |  |  | A2 |
|  |  |  | A3 |
|  |  |  | A4 |
|  |  |  | A5 |
|  |  |  | A6 |
|  |  |  | A7 |
|  |  |  | A8 |
| uncompressed two field | 1 | 10 | VFIELD1 |
|  |  |  | VFIELD2 |
|  |  |  | A1 |
|  |  |  | A2 |
|  |  |  | A3 |
|  |  |  | A4 |
|  |  |  | A5 |
|  |  |  | A6 |
|  |  |  | A7 |
|  |  |  | A8 |

Figure 15:
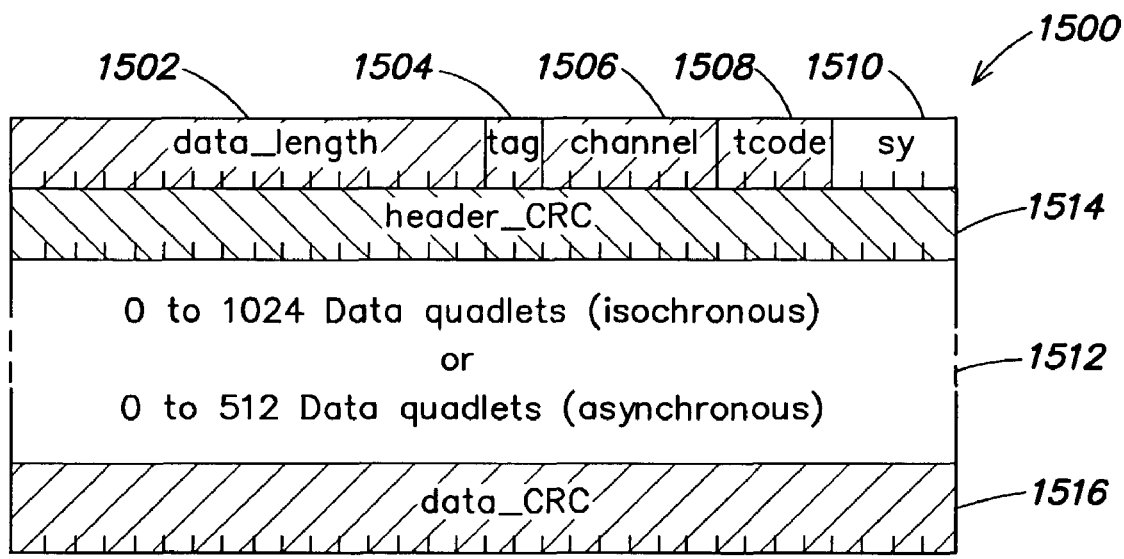
FIG. 15 illustrates an example data packet format.

Data packets convey actual audio, video and metadata. An example format for a data packet 1500 is shown in FIG. 15. This format corresponds to either an asynchronous packet or an isochronous packet. The data packet format is a basic IEEE-1394 streaming packet. One frame of data for a single stream is broken up into a series of packets of this format. The shaded fields indicate those defined by the IEEE-1394 standard. The "data_length" field 1502 includes the length in bytes of the payload section 1512 of the packet. The "tag" field 1504 includes the value 00b which indicates that the data is unformatted. The "channel" field 1506 includes a value that indicates the channel assigned to the talker and listener for transmission of this packet. The "tcode" field 1508 includes the value 1010b which indicates that this packet is a streaming packet. The "sy" field 1510 includes the value 0000b to indicate that this packet is a data packet. The data packet also may include fields that enable error detection and correction ("header_CRC" 1514 and "data_CRC" 1516).

The payload 1512 of a data packet includes 1 to 1024 data quadlets (meaning 4 bytes of data) for an isochronous packet. There are 1 to 512 data quadlets for an asynchronous packet. In general, a talker formats the data for a data interval into N packets of data of the same fixed size to fit the payload of the data packet. This size can be the maximum size allowed by the transmission mode being used to efficiently use bandwidth. For example, in the IEEE-1394a standard, this maximum may be either 2,048 or 4,096 bytes. If the length of the data is not evenly divisible by this quantity, then it is permissible to generate a short packet at the end of a stream.

For example, assume an uncompressed, full frame of NTSC 4:2:2 YUV format video data is transmitted using isochronous mode of IEEE-1394. The frame is transmitted as two fields, there are (240 lines*720 pixels*2 bytes-per-pixel=) 345,600 bytes per field. To send a single field in 4096-byte packets, the number of packets used is computed as: 345,600 bytes per field/4096 bytes per packet=84 packets with a remainder 1536 bytes, indicating that 84 4096-byte packets and one 1536-byte packet will be transmitted.

It is also permissible for a talker to transmit a short packet at the beginning of a stream if there are memory page alignment constraints. For instance, if the talker is generating the packets for a stream out of a host buffer that is not aligned on a 4096-byte boundary, then each packet in the stream would cross a page boundary, resulting in poor direct memory access performance. To remedy this, the talker can generate a short packet at the beginning in order to insure that the remaining packets are generated out of buffers that are aligned on 4096-byte boundaries. For example, if the memory buffer for a field to transmit is located at address 119403A4H, then the next 4096-byte boundary is at address 11941000H. That means that there are 119403A4H-11941000H=C5CH, or 3,164 (decimal) bytes, until the next page boundary. Thus, the first packet would be 3,164 bytes generated out of address 119403A4H, the second packet would be 4,096 bytes generated out of address 11941000H, the third packet would be 4,096 bytes generated out of address 11942000H, and so on.

Figure 16:
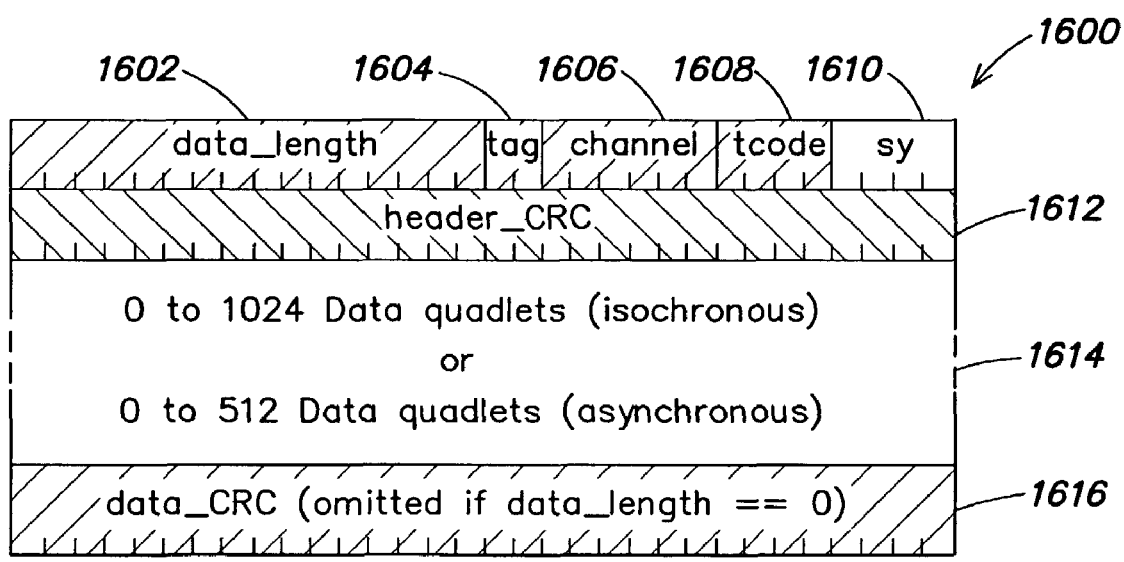
FIG. 16 illustrates an example null packet format.

The host may transmit null packets for any unused isochronous cycle. During data transmission, one or more null packets may be sent in the data intervals between the transmission of data for each data interval. An example format for a null packet 1600 is shown in FIG. 16. This format corresponds to either an asynchronous packet or an isochronous packet. The shaded fields indicate those defined by the IEEE-1394 standard. The "data_length" field 1602 may include any value, including the value 0. If the data_length is zero, then the payload portion 1614 and error correction data 1616 are omitted from the packet. If the data length is non-zero, then dummy data is in the payload 1614 following the header with a number of quadlets corresponding to the value specified in field 1602. The "tag" field 1604 includes the value 00b which indicates that the data is unformatted. The "channel" field 1606 includes a value that indicates the channel assigned to the talker and listener for transmission of this packet. The "tcode" field 1608 includes the value 1010b which indicates that this packet is a streaming packet. The "sy" field 1610 includes the value 0000b. An optional payload portion 1614 of this packet, if present, is ignored by the listener. Fields that enable error detection and correction ("header_CRC" 1612 and "data_CRC" 1616) may be provided.

Sequencing and timing of packet transmissions for host-to-device and device-to-host transfers using this protocol will now be described.

As noted above, to transmit data from a host to a device, a host and device first set up parameters of the communication using the control protocol described below. The host then waits, for example by sending null packets, until a data interval begins. These null packets are ignored by the device. At the beginning of the next data interval, a synchronization packet is sent from the device to the host indicating that a new data interval has begun. After receiving the synchronization packet, the host may send data. In one embodiment, a preamble packet is sent from the host to indicate to the device which streams will be transmitted during the data interval, in what order they will be sent, and how many packets will be used to transport each stream. The device processes the preamble packet to set up appropriate parameters of the device. Data packets then are sent by the host. These data packets are then received and processed by the device. After the data for the data interval has been sent, the host then waits for the next data interval. For example, the host may send null packets to fill bus cycles until the next data interval begins. This sequence of packets is repeated for each data interval.

As noted above, to transmit data from a device to a host, a host and device first set up parameters of the communication using the control protocol described below. The host then waits, for example by sending null packets, until a data interval begins. These null packets are ignored by the device. At the beginning of the next data interval, a synchronization packet is sent from the device to the host indicating that a new data interval has begun. After sending the synchronization packet, the device may send data. In one embodiment, a preamble packet is sent from the device to indicate to the host which streams will be transmitted during the data interval, in what order they will be sent, and how many packets will be used to transport each stream. The host processes the preamble packet to set up appropriate parameters. Data packets then are sent by the device. These data packets are then received and processed by the host. After the data for the data interval has been sent, the device then waits for the next data interval. For example, the device may send null packets to fill bus cycles until the next data interval begins. This sequence of packets is repeated for each data interval.

In addition to the data transport protocol, a control protocol is provided. Two types of control information are conveyed by the control protocol: commands which control the modes and parameters of the peripheral device hardware (herein called "break-out box (BOB) control"), and commands which control the operation of a DV camcorder or VTR attached to the peripheral device's IEEE-1394 compliant port (called device control).

BOB control commands may use asynchronous packets in the IEEE-1394 protocol. Device control commands may use the AV/C command set, an industry standard for controlling camcorders and VTRs. AV/C commands intended for the external device are forwarded directly to that device by the peripheral device hardware, and responses are returned to the host in a similar manner. The AV/C commands are defined in several documents, hereby incorporated by reference, which include: AV/C Digital Interface Command Set General Specification (version 3.0) and AV/C Tape Recorder/Player Sub-unit Specification. Thus, for device control commands, the communication protocol complies with the existing IEC 61883-1 and IEEE-1394 Trade Association AV/C specifications. The peripheral device relays commands and responses between the host and external device as though the host were directly interacting with the external device.

BOB control employs a command set that includes command sequences that are transmitted over the IEEE-1394 compliant bus between the host and the peripheral device. Each command sequence includes a command frame transmitted from the host to the peripheral device, and a corresponding response frame transmitted from the peripheral device to the host. Command frames include a command code and optional parameters. Response frames include a success code and optional data values requested by the command.

Using the IEEE-1394 protocol, a Write Data Block Request format packet is used, having a "tcode" of "1h". The destination offset specified by a packet designates the registers specified for receiving the commands and responses in this protocol. The payload of such a packet includes up to 1024 bytes. The first two bytes of the payload includes a fixed value that represents that the packet includes a BOB control command or response. The next two bytes indicate the packet length. Two more bytes provide the information, such as parameters for a command, status of a command or other information. An additional byte is reserved. The last byte of the payload conveys status information and determines whether the packet is part of a command or a response, and whether it is part of a single- or multi-packet command.

The BOB control allows the host to control and query the modes, status and parameters of the peripheral device. The various commands depend on the implementation of the peripheral device, its modes and available registers for status information and control settings. To simplify operation of multiple devices connected to the same bus and same periodic reference signal, the BOB control protocol should allow for a command to instruct the peripheral device not to send flow control messages in response to frame boundaries defined by the periodic reference signal.

The foregoing describes an example device and communication protocol for communication between the device and a host over a serial bus that allows control of the flow of data transferred between the host and the device so that synchronization to a periodic reference signal can be achieved. The protocol involves transferring flow control messages between the peripheral device and the host computer, allowing the peripheral device to control how the host computer sends the uncompressed audio and video data. The audio and video data may be sent as separate streams. Using the IEEE-1394 protocol, the flow control messages are sent using an asynchronous protocol, whereas uncompressed video and audio data are sent using an isochronous protocol.

Further, separate streams of uncompressed video and audio data are transferred from the host computer over a serial bus to the peripheral device, where the peripheral device performs operations on the data such as encoding the data into a standard format, such as DV and MPEG, or generating an analog video signal. Decoding of standard format data is not required to generate such an analog video signal, resulting in less processing. Further, when the host computer is used to process digital video and audio data for editing audiovisual programs, the resources on the host computer are not used for encoding video data. Therefore the host computer resources can be used for more creative operations on the video and audio data. The peripheral device also may output standard format data using a standard protocol over a standard bus. For example, the peripheral device may generate DV format data from the uncompressed audio and video data, and output the DV format data using a standard DV transport protocol over an IEEE-1394 compliant serial bus.

The peripheral device also can be used to synchronize an output of another device, such as a transcoder connected to the peripheral device via a serial bus such as an IEEE-1394 compliant bus, to a periodic reference signal received by the peripheral device. For example, the peripheral device may perform DV encoding of the uncompressed audio and video data received from the host computer. The peripheral device then transfers this DV format data over the serial bus using a standard protocol to the other device. The operation of this other transcoder may be genlocked to a periodic reference signal provided to the peripheral device.

The host may be configured to receive a stream of audio from the peripheral device during transfer of an audio-video stream to the peripheral device. Such an audio stream would be data received through the peripheral device which may be used to implement audio dubbing or punch-in. In this embodiment, the audio-video stream is sent from the host to the peripheral device as a stream of isochronous packets. The audio data for dubbing or punch-in is sent from the peripheral device to the host as a stream of asynchronous packets. The peripheral device may mix the audio stream with the audio in the received audio video stream for playback through or output to another device.

For example, referring to FIGS. 10A and 10B, audio codec 1006 receives input audio (at 1040, 1041) and produces digital audio data for storage in the media hub 1028. Meanwhile, the IEEE-1394 interface 1004 receives the audio-video data stream and provides it to the media hub 1028. After receipt of a frame of data, the media hub 1028 mixes the received audio data from codec 1006 and from interface 1004 and outputs the mixed data to the codec 1006 and HeadPhone DAC 1012 to generate audio outputs. The microprocessor 1022 is instructed to periodically retrieve audio data from the media hub 1028 to send the data as multiple asynchronous packets to the host over the interface 1051.

It also should be understood that the host computer and peripheral device as described herein may be any kind of source and recipient connected over a bus to communicate temporal data in synchronization with a periodic reference signal.

It also should be understood that the host computer may store computer program instructions on a computer readable medium that, when executed by the host computer, cause the host computer to transfer data from the host computer to the peripheral device or to cause the host computer to receive data from the peripheral device. Similarly, the controller 1020 (FIGS. 10A-10B) on the device may accessed stored computer program instructions to cause the device to perform a variety of operations.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed:

1. A method for transferring data from a first device to a second device over a bus, performed by the second device for each data interval defined by a periodic reference signal processed by the second device, and comprising:

sending a synchronization packet over the bus to the first device for the data interval in response to the periodic reference signal;

receiving a plurality of packets over the bus from the first device after receipt by the first device of the synchronization packet, wherein the packets include data for the data interval; and repeating the steps of sending and receiving for each data interval defined by the periodic reference signal.

2. The method of claim 1, wherein the plurality of packets comprises:

a preamble packet indicating a number of data packets to be sent; and one or more data packets.

3. The method of claim 2, wherein the data comprises a plurality of streams of data, and wherein the preamble packet indicates streams to be transmitted during the interval, an order of transmission of the data streams, and a number of packets used for each stream.

4. The method of claim 2, wherein data packets comprises at least one of video data packets and audio data packets.

5. The method of claim 1, wherein the plurality of packets comprises zero or more null packets after the one or more data packets for a remainder of the data interval.

6. The method of claim 1, wherein the data interval corresponds to at least one of a frame of video data and a field of video data.

7. The method of claim 1, wherein the bus is an IEEE-1394 compliant serial bus.

8. The method of claim 7, wherein the synchronization packet is an asynchronous packet.

9. The method of claim 7, wherein the plurality of packets are isochronous packets.

10. The method of claim 1 further comprising:

receiving from the first device a command to start transfer of the data; and receiving from the first device zero or more null packets over the bus until a first synchronization packet for a first data interval is sent by the second device.

11. The method of claim 1, further comprising:

receiving the data in a buffer at the second device; and outputting the data from the second device in synchronization with the periodic reference signal.

12. The method of claim 11, wherein outputting the data comprises encoding and outputting an analog video signal.

13. The method of claim 11, wherein outputting comprises generating DV format video data.

14. A device for connection to a source of data over a bus, comprising:

a bus interface for sending packets to and receiving packets from the source of data over the bus;

a controller having an input for receiving a signal related to a periodic reference signal defining a plurality of data intervals, and having an output for providing instructing the bus interface to send a synchronization packet over the bus to the source of data for each data interval in response to the periodic reference signal; and a buffer connected to receive data for the data interval from a plurality of packets received through the bus interface over the bus from the source of data after receipt by the source of data of the synchronization packet.

15. A method for transferring data from a first device to a second device over a bus, comprising, for each data interval defined by a periodic reference signal processed by the first device:

the first device sending a synchronization packet over the bus to the second device for the data interval;

the first device sending a plurality of packets over the bus to the second device after sending the synchronization packet, wherein the packets include data for the data interval; and the first device waiting until the next data interval according to the periodic reference signal.

16. The method of claim 15, wherein the plurality of packets comprises:

a preamble packet indicating a number of data packets to be sent; and one or more data packets.

17. The method of claim 16, wherein the data comprises a plurality of streams of data, and wherein the preamble packet indicates streams to be transmitted during the interval, an order of transmission of the data streams, and a number of packets used for each stream.

18. The method of claim 16, wherein data packets comprises at least one of video data packets and audio data packets.

19. The method of claim 15, wherein waiting comprises sending zero or more null packets over the bus to the second device for a remainder of the data interval.

20. The method of claim 15, wherein the data interval corresponds to a frame of video data.

21. The method of claim 15, wherein the periodic reference signal is received by the first device.

22. The method of claim 15, wherein the periodic reference signal is generated by the first device.

23. The method of claim 15, further comprising:

receiving from the second device a command to start transfer of the data; and sending zero or more null packets over the bus to the second device until a first synchronization packet for a first data interval is sent.

24. A computer program product, comprising:

a computer readable storage device;

computer program instructions stored on the computer readable storage device that, when executed by a host computer, cause the host computer to perform a method for transferring data from a peripheral device to the host computer over a bus, comprising, for each data interval defined by a periodic reference signal processed by the peripheral device:

receiving a synchronization packet over the bus from the peripheral device for the data interval;

receiving a plurality of packets over the bus from the peripheral device after receiving the synchronization packet, wherein the packets include data for the data interval; and after receiving the plurality of packets, waiting until receiving a synchronization packet over the bus from the peripheral device for a subsequent data interval.

25. A system comprising:

a host computer;

a peripheral device connected to the host computer via a bus;

wherein the peripheral device comprises means for sending a synchronization packet over the bus to the host computer for each data interval according to a periodic reference signal;

wherein the host computer comprises means for sending a plurality of packets over the bus to the peripheral device after receipt of the synchronization packet, wherein the packets include data for the data interval, and means, operative after sending the plurality of packets for the data interval, for waiting until a synchronization packet for a subsequent data interval is received.

* * * * *